US009221964B2

(12) United States Patent
Ono et al.

(10) Patent No.: US 9,221,964 B2
(45) Date of Patent: Dec. 29, 2015

(54) RUBBER COMPOSITION AND PNEUMATIC TIRE

(75) Inventors: Shuichiro Ono, Kobe (JP); Katsumi Terakawa, Kobe (JP); Ryuichi Tokimune, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/346,801

(22) PCT Filed: Jun. 26, 2012

(86) PCT No.: PCT/JP2012/066205
§ 371 (c)(1),
(2), (4) Date: Mar. 24, 2014

(87) PCT Pub. No.: WO2013/077015
PCT Pub. Date: May 30, 2013

(65) Prior Publication Data
US 2014/0213714 A1    Jul. 31, 2014

(30) Foreign Application Priority Data

Nov. 24, 2011  (JP) ................ 2011-256619
Nov. 24, 2011  (JP) ................ 2011-256620
Nov. 24, 2011  (JP) ................ 2011-256621

(51) Int. Cl.
C08K 3/36      (2006.01)
C08F 220/06    (2006.01)
C08L 7/00      (2006.01)
B60C 1/00      (2006.01)
C08F 230/08    (2006.01)
C08C 19/44     (2006.01)
C08K 5/548     (2006.01)

(52) U.S. Cl.
CPC ... *C08L 7/00* (2013.01); *B60C 1/00* (2013.01); *B60C 1/0016* (2013.04); *C08C 19/44* (2013.01); *C08F 230/08* (2013.01); *C08K 3/36* (2013.01); *C08K 5/548* (2013.01); *B60C 2001/005* (2013.01); *Y02T 10/862* (2013.01)

(58) Field of Classification Search
USPC ................................. 524/492, 547
See application file for complete search history.

(56) References Cited

U.S. PATENT DOCUMENTS

| 4,929,679 A | 5/1990 | Akita et al. |
| 4,945,964 A | 8/1990 | Takiguchi et al. |
| 5,189,109 A | 2/1993 | Imai et al. |
| 5,574,109 A | 11/1996 | Lawson et al. |
| 5,679,744 A | 10/1997 | Kawauzra et al. |
| 5,834,552 A | 11/1998 | Kawazura et al. |
| 5,902,856 A | 5/1999 | Suzuki et al. |
| 5,932,662 A | 8/1999 | Lawson et al. |
| 7,084,228 B2 | 8/2006 | Labauze et al. |
| 7,351,761 B2 | 4/2008 | Hochi |
| 2004/0152845 A1 | 8/2004 | Oshima et al. |
| 2005/0209413 A1 | 9/2005 | Labauze et al. |
| 2006/0173118 A1 | 8/2006 | Hochi et al. |
| 2007/0149688 A1 | 6/2007 | Hochi |
| 2008/0289740 A1 | 11/2008 | Mori et al. |
| 2009/0247696 A1* | 10/2009 | Fujii et al. .................. 524/572 |
| 2010/0048806 A1 | 2/2010 | Inagaki et al. |
| 2010/0056703 A1 | 3/2010 | Oshima |
| 2010/0056709 A1 | 3/2010 | Oshima |
| 2010/0056710 A1 | 3/2010 | Oshima |
| 2010/0056712 A1 | 3/2010 | Oshima |

(Continued)

FOREIGN PATENT DOCUMENTS

CN    1134434 A    10/1996
CN    1148606 A    4/1997

(Continued)

OTHER PUBLICATIONS

English machine translation of JP-2000-239444-A dated Sep. 5, 2000.

(Continued)

*Primary Examiner* — Ling Choi
*Assistant Examiner* — Thuy-Al Nguyen
(74) *Attorney, Agent, or Firm* — Birch, Stewart, Kolasch & Birch, LLP

(57) ABSTRACT

Provided are: a rubber composition achieving balanced improvement in fuel economy, abrasion resistance, and processability, and a pneumatic tire including the composition. The rubber composition includes: a conjugated diene polymer; silica; and a silane coupling agent, the polymer being obtained by polymerizing a monomer component including a conjugated diene compound and a silicon-containing vinyl compound in the presence of a polymerization initiator of formula (I):

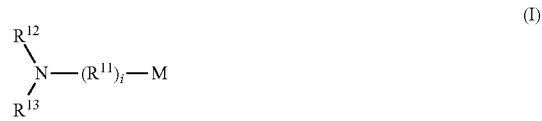

to produce a copolymer, and reacting a compound containing nitrogen and/or silicon atoms with an active terminal of the copolymer, wherein the rubber composition contains the conjugated diene polymer in an amount of 5-45% by mass per 100% by mass of a rubber component, the silica in an amount of 5 to 100 parts by mass per 100 parts by mass of the rubber component, and the coupling agent in an amount of 2-12 parts by mass per 100 parts by mass of the silica.

21 Claims, No Drawings

(56) References Cited

U.S. PATENT DOCUMENTS

| | | |
|---|---|---|
| 2010/0056713 A1 | 3/2010 | Oshima |
| 2010/0144954 A1 | 6/2010 | Kikuchi et al. |
| 2010/0184908 A1 | 7/2010 | Kikuchi et al. |
| 2010/0296376 A1 | 11/2010 | Narita |
| 2011/0166254 A1 | 7/2011 | Nishimura |
| 2011/0237737 A1 | 9/2011 | Fujii et al. |
| 2011/0245398 A1 | 10/2011 | Hama et al. |
| 2012/0190771 A1 | 7/2012 | Ito et al. |
| 2012/0283354 A1 | 11/2012 | Hattori et al. |
| 2013/0085225 A1 | 4/2013 | Nishioka et al. |
| 2014/0114014 A1 | 4/2014 | Tokimune et al. |
| 2014/0213714 A1 | 7/2014 | Ono et al. |
| 2014/0228501 A1 | 8/2014 | Ono et al. |
| 2014/0233693 A1 | 8/2014 | Wang et al. |
| 2014/0256847 A1 | 9/2014 | Sato et al. |
| 2014/0275430 A1 | 9/2014 | Ishino et al. |
| 2014/0329930 A1 | 11/2014 | Sato |
| 2014/0329931 A1 | 11/2014 | Sato |

FOREIGN PATENT DOCUMENTS

| | | |
|---|---|---|
| CN | 1386786 A | 12/2002 |
| CN | 1530379 A | 9/2004 |
| CN | 1821293 A | 8/2006 |
| CN | 1990532 A | 7/2007 |
| CN | 101113217 A | 1/2008 |
| CN | 101659729 A | 3/2010 |
| CN | 101659731 A | 3/2010 |
| CN | 101671418 A | 3/2010 |
| CN | 102093602 A | 6/2011 |
| CN | 102093605 A | 6/2011 |
| CN | 102108141 A | 6/2011 |
| CN | 102603975 | 7/2012 |
| CN | 103003346 A | 3/2013 |
| EP | 0 585 012 A1 | 3/1994 |
| EP | 0 881 101 A1 | 12/1998 |
| EP | 1 484 362 A1 | 12/2004 |
| EP | 1 803 770 A2 | 7/2007 |
| EP | 1 925 636 A1 | 5/2008 |
| EP | 2 196 324 A1 | 6/2010 |
| EP | 2 223 959 A1 | 9/2010 |
| EP | 2 236 554 A1 | 10/2010 |
| EP | 2 329 964 A1 | 6/2011 |
| EP | 2 338 698 A1 | 6/2011 |
| EP | 2 338 919 A1 | 6/2011 |
| EP | 2 366 557 A1 | 9/2011 |
| EP | 2 366 588 A1 | 9/2011 |
| EP | 2 404 944 A1 | 1/2012 |
| JP | 48-17674 B1 | 5/1973 |
| JP | 56-131640 A | 10/1981 |
| JP | 63-99249 A | 4/1988 |
| JP | 63-99252 A | 4/1988 |
| JP | 8-193147 A | 7/1996 |
| JP | 8-231766 A | 9/1996 |
| JP | 8-253520 A | 10/1996 |
| JP | 2000-239444 A | 9/2000 |
| JP | 2000-344955 A | 12/2000 |
| JP | 2001-151940 A | 6/2001 |
| JP | 2004-137463 A | 5/2004 |
| JP | 2004-277696 A | 10/2004 |
| JP | 2004-331940 A | 11/2004 |
| JP | 2006-182940 A | 7/2006 |
| JP | 2006-233177 A | 9/2006 |
| JP | 2006-257260 A | 9/2006 |
| JP | 2007-197671 A | 8/2007 |
| JP | 2008-101158 A | 5/2008 |
| JP | 2009-1721 A | 1/2009 |
| JP | 2009-35643 A | 2/2009 |
| JP | 2010-77412 A | 4/2010 |
| JP | 2010-77413 A | 4/2010 |
| JP | 2010-77414 A | 4/2010 |
| JP | 2010-254852 A | 11/2010 |
| JP | 2011-79913 A | 4/2011 |
| JP | 2011-144324 A | 7/2011 |
| JP | 2012-167257 A | 9/2012 |
| WO | WO 2009/048006 A1 | 4/2009 |
| WO | WO 2010/116988 A1 | 10/2010 |
| WO | WO 2011/087004 A1 | 7/2011 |
| WO | WO 2012/011571 A1 | 1/2012 |

OTHER PUBLICATIONS

English machine translation of JP-2011-144324-A dated Jul. 28, 2011.
English machine translation of JP-2011-79913-A dated Apr. 21, 2011.
International Search Report for PCT/JP2012/066205 mailed on Sep. 18, 2012.
International Preliminary Report on Patentability and English Translation of the Written Opinion of the International Searching Authority (Forms PCT/IB373 and PCT/ISA/237), dated Jul. 1, 2014, for International Application No. PCT/JP2012/066204.
International Search Report (Form PCT/ISA/210), dated Sep. 18, 2012, for PCT/JP2012/066206.
International Search Report (Form PCT/ISA/210), dated Oct. 2, 2012, for PCT/JP2012/066210.
International Search Report (Form PCT/ISA/210), dated Oct. 2, 2012, for PCT/JP2012/066221.
International Search Report (Form PCT/ISA/210), dated Sep. 18, 2012, for PCT/JP2012/066204.
International Search Report issued in PCT/JP2012/066217, dated Oct. 2, 2012.
U.S. Notice of Allowance, dated Dec. 22, 2014, for U.S. Appl. No. 14/347,290.
U.S. Office Action, dated Dec. 12, 2014, for U.S. Appl. No. 14/361,206.
U.S. Office Action, dated Dec. 24, 2014, for U.S. Appl. No. 14/354,307.
U.S. Office Action, dated Dec. 26, 2014, for U.S. Appl. No. 14/126,746.
U.S. Office Action, dated Dec. 26, 2014, for U.S. Appl. No. 14/354,345.
U.S. Office Action, dated Jan. 15, 2015, for U.S. Appl. No. 14/354,159.
U.S. Office Action, dated Nov. 20, 2014 for U.S. Appl. No. 14/361,208.

* cited by examiner

RUBBER COMPOSITION AND PNEUMATIC TIRE

TECHNICAL FIELD

The present invention relates to a rubber composition and a pneumatic tire formed from the rubber composition.

BACKGROUND ART

Silica is, as is generally known, added as a filler into rubber compositions for treads to reduce the rolling resistance (to improve the fuel economy) of tires. The use of silica in a rubber composition for treads enables to not only reduce rolling resistance but also enhance wet traction performance.

In order to meet the recent demand for further reduction in rolling resistance, the use of silica is being considered, not only for rubber compositions for treads but also for rubber compositions for other components such as a clinch apex. Unlike rubber compositions for treads, however, conventional rubber compositions for clinch apexes contain carbon black with a large particle size. The use of silica instead of carbon black is not so effective in reducing rolling resistance. Moreover, Patent Literature 1 proposes a method in which a silica having a small nitrogen adsorption specific surface area is used. Unfortunately, this method does not satisfy the recent demand for reduced rolling resistance.

Furthermore, as rubber compositions for automobile tires also need to be excellent in abrasion resistance and processability, a technique is desired which achieves balanced improvements in these properties as well as fuel economy at high levels.

CITATION LIST

Patent Literature

Patent Literature 1: JP 2009-35643 A

SUMMARY OF INVENTION

Technical Problem

An object of the present invention is to solve the problems identified above by providing a rubber composition capable of achieving a balanced improvement in fuel economy, abrasion resistance, and processability, and by providing a pneumatic tire including the rubber composition.

Solution to Problem

The present invention relates to a rubber composition, including:
a conjugated diene polymer;
silica; and
a silane coupling agent,
the conjugated diene polymer being obtained by polymerizing a monomer component including a conjugated diene compound and a silicon-containing vinyl compound in the presence of a polymerization initiator represented by the following formula (I):

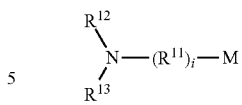

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing at least one of a nitrogen atom and a silicon atom with an active terminal of the copolymer, wherein the rubber composition includes
the conjugated diene polymer in an amount of 5 to 45% by mass based on 100% by mass of a rubber component of the rubber composition,
the silica in an amount of 5 to 100 parts by mass for each 100 parts by mass of the rubber component, and
the silane coupling agent in an amount of 2 to 12 parts by mass for each 100 parts by mass of the silica.

$R^{11}$ in the formula (I) is preferably a group represented by the following formula (Ia):

wherein $R^{14}$ represents a hydrocarbylene group including at least one of a structural unit derived from a conjugated diene compound and a structural unit derived from an aromatic vinyl compound; and n represents an integer of 1 to 10.

$R^{14}$ in the formula (Ia) is preferably a hydrocarbylene group including from one to ten isoprene-derived structural unit(s).

The silicon-containing vinyl compound is preferably a compound represented by the following formula (II):

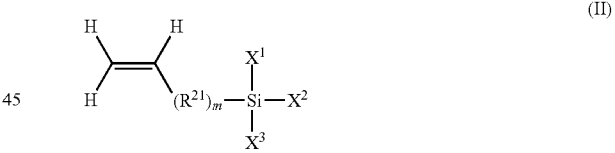

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

The conjugated diene polymer preferably contains a structural unit derived from an aromatic vinyl compound.

The silica preferably includes silica (1) having a nitrogen adsorption specific surface area of at least 40 m²/g but less than 120 m²/g, and silica (2) having a nitrogen adsorption specific surface area of not less than 120 m²/g.

The rubber composition preferably includes a liquid resin having a softening point of −20 to 20° C. in an amount of 1 to 10 parts by mass for each 100 parts by mass of the rubber component.

Preferably, the silica includes silica (1) having a nitrogen adsorption specific surface area of at least 40 m²/g but less than 120 m²/g, and silica (2) having a nitrogen adsorption specific surface area of not less than 120 m²/g, and the rubber composition includes a liquid resin having a softening point of −20 to 20° C. in an amount of 1 to 10 parts by mass for each 100 parts by mass of the rubber component.

The silane coupling agent is preferably a compound containing a mercapto group.

Preferably, the silane coupling agent is a compound containing a mercapto group, and the silica includes silica (1) having a nitrogen adsorption specific surface area of at least 40 m$^2$/g but less than 120 m$^2$/g, and silica (2) having a nitrogen adsorption specific surface area of not less than 120 m$^2$/g.

Preferably, the silane coupling agent is a compound containing a mercapto group, and the rubber composition includes a liquid resin having a softening point of −20 to 20° C. in an amount of 1 to 10 parts by mass for each 100 parts by mass of the rubber component.

Preferably, the silane coupling agent is a compound containing a mercapto group, the silica includes silica (1) having a nitrogen adsorption specific surface area of at least 40 m$^2$/g but less than 120 m$^2$/g, and silica (2) having a nitrogen adsorption specific surface area of not less than 120 m$^2$/g, and the rubber composition includes a liquid resin having a softening point of −20 to 20° C. in an amount of 1 to 10 parts by mass for each 100 parts by mass of the rubber component.

Preferably, the silane coupling agent is at least one of a compound represented by the formula (1) below, and a compound containing a linking unit A represented by the formula (2) below and a linking unit B represented by the formula (3) below,

wherein $R^{101}$ to $R^{103}$ each represent a branched or unbranched $C_{1-12}$ alkyl group, a branched or unbranched $C_{1-12}$ alkoxy group, or a group represented by —O—($R^{111}$—O)$_z$—$R^{112}$ where z $R^{111}$s each represent a branched or unbranched $C_{1-30}$ divalent hydrocarbon group, and z $R^{111}$s may be the same as or different from one another; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and z represents an integer of 1 to 30, and $R^{101}$ to $R^{103}$ may be the same as or different from one another; and $R^{104}$ represents a branched or unbranched $C_{1-6}$ alkylene group;

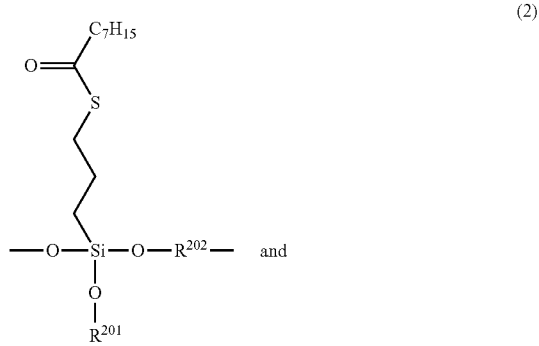

and

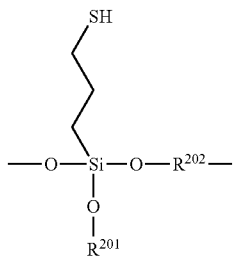

wherein $R^{201}$ represents a hydrogen atom, a halogen atom, a branched or unbranched $C_{1-30}$ alkyl group, a branched or unbranched $C_{2-30}$ alkenyl group, a branched or unbranched $C_{2-30}$ alkynyl group, or the alkyl group in which a terminal hydrogen atom is replaced with a hydroxy group or a carboxyl group; $R^{202}$ represents a branched or unbranched $C_{1-30}$ alkylene group, a branched or unbranched $C_{2-30}$ alkenylene group, or a branched or unbranched $C_{2-30}$ alkynylene group; and $R^{201}$ and $R^{202}$ may be joined together to form a cyclic structure.

Preferably, the silica includes silica (1) having a nitrogen adsorption specific surface area of at least 40 m$^2$/g but less than 120 m$^2$/g, and silica (2) having a nitrogen adsorption specific surface area of not less than 120 m$^2$/g, and the nitrogen adsorption specific surface areas and amounts of the silica (1) and the silica (2) satisfy the following inequalities:

(Nitrogen adsorption specific surface area of silica (2))/(Nitrogen adsorption specific surface area of silica (1))≥1.4, and (Amount of silica (1))×0.06≤(Amount of silica (2))≤ (Amount of silica (1))×15.

The present invention also relates to a pneumatic tire, formed from the rubber composition.

Advantageous Effects of Invention

The rubber composition of the present invention is a rubber composition including a specific amount of a specific conjugated diene polymer, a specific amount of silica, and a specific amount of a silane coupling agent. Thus, the rubber composition enables to provide a pneumatic tire capable of achieving a balanced improvement in fuel economy, abrasion resistance, and processability.

DESCRIPTION OF EMBODIMENTS

As used herein, a hydrocarbyl group denotes a monovalent group provided by removing one hydrogen atom from a hydrocarbon; a hydrocarbylene group denotes a divalent group provided by removing two hydrogen atoms from a hydrocarbon; a hydrocarbyloxy group denotes a monovalent group provided by replacing the hydrogen atom of a hydroxy group with a hydrocarbyl group; a substituted amino group denotes a group provided by replacing at least one hydrogen atom of an amino group with a monovalent atom other than a hydrogen atom or with a monovalent group, or denotes a group provided by replacing the two hydrogen atoms of an amino group with a divalent group; a hydrocarbyl group having a substituent (hereinafter, also referred to as substituted hydrocarbyl group) denotes a monovalent group provided by replacing at least one hydrogen atom of a hydrocarbyl group with a substituent; and a hydrocarbylene group containing a hetero atom (hereinafter, also referred to as hetero atom-containing hydrocarbylene group) denotes a divalent group provided by replacing a hydrogen atom and/or a carbon atom other than the carbon atoms from which a hydrogen atom has been removed in a hydrocarbylene group with a group containing a hetero atom (an atom other than carbon and hydrogen atoms).

The conjugated diene polymer according to the present invention is obtained by polymerizing a monomer component including a conjugated diene compound and a silicon-containing vinyl compound in the presence of a polymerization initiator represented by the following formula (I):

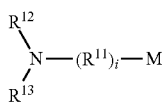
(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing a nitrogen atom and/or a silicon atom with an active terminal of the copolymer.

As used herein, the term "modifying" means bonding a copolymer derived from a diene compound alone or with an aromatic vinyl compound, to a compound other than the compounds. The above conjugated diene polymer has a structure in which the polymerization initiation terminal is modified by a polymerization initiator represented by the formula (I); the main chain is modified by copolymerization with a silicon-containing vinyl compound; and the termination terminal is modified by a compound containing a nitrogen atom and/or a silicon atom, a silicon-containing vinyl compound. The use of the conjugated diene polymer in combination with other rubber materials enables to disperse silica well and achieve a balanced improvement in fuel economy, abrasion resistance, and processability. In general, the use of a modified rubber in which all of the initiation terminal, main chain and termination terminal are modified tends to greatly deteriorate processability. In contrast, the conjugated diene polymer in which the initiation terminal, main chain and termination terminal are modified by the respective specific compounds ensures good processability and also makes it possible to synergistically enhance the effects of improving fuel economy and abrasion resistance. Therefore, balanced improvements in fuel economy, abrasion resistance, and processability can be achieved at high levels.

In the formula (I), i is 0 or 1, preferably 1.

$R^{11}$ in the formula (I) is a $C_{1-100}$ hydrocarbylene group, preferably a $C_{6-100}$ hydrocarbylene group, and more preferably a $C_{7-80}$ hydrocarbylene group. If $R^{11}$ has more than 100 carbon atoms, the polymerization initiator has an increased molecular weight, which may reduce the cost efficiency and the workability during the polymerization.

Plural kinds of compounds differing in the carbon number of $R^{11}$ may be used in combination as the polymerization initiator represented by the formula (I).

$R^{11}$ in the formula (I) is preferably a group represented by the following formula (Ia):

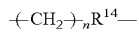
(Ia)

wherein $R^{14}$ represents a hydrocarbylene group including a structural unit derived from a conjugated diene compound and/or a structural unit derived from an aromatic vinyl compound; and n represents an integer of 1 to 10.

$R^{14}$ in the formula (Ia) represents a hydrocarbylene group including a structural unit derived from a conjugated diene compound and/or a structural unit derived from an aromatic vinyl compound, preferably a hydrocarbylene group including an isoprene-derived structural unit, and more preferably a hydrocarbylene group including from one to ten isoprene-derived structural unit(s).

The number of the structural unit derived from a conjugated diene compound and/or the structural unit derived from an aromatic vinyl compound in $R^{14}$ preferably ranges from one to ten, and more preferably from one to five.

In the formula (Ia), n represents an integer of 1 to 10, preferably an integer of 2 to 4.

Examples of $R^{11}$ include a group obtained by bonding from one to ten isoprene-derived structural unit(s) and a methylene group, a group obtained by bonding from one to ten isoprene-derived structural unit(s) and an ethylene group, and a group obtained by bonding from one to ten isoprene-derived structural unit(s) and a trimethylene group, preferably a group obtained by bonding from one to ten isoprene-derived structural unit(s) and a trimethylene group.

In the formula (I), $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing an atom, as a hetero atom, selected from the group consisting of a silicon atom, a nitrogen atom, and an oxygen atom.

The optionally substituted hydrocarbyl group refers to a hydrocarbyl group or substituted hydrocarbyl group. The substituent in the substituted hydrocarbyl group may be a substituted amino group or a hydrocarbyloxy group. Examples of the hydrocarbyl groups include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-octyl group, and an n-dodecyl group; cyclic alkyl groups such as a cyclopentyl group and a cyclohexyl group; and aryl groups such as a phenyl group and a benzyl group, preferably acyclic alkyl groups, and more preferably $C_{1-4}$ acyclic alkyl groups. Examples of the substituted hydrocarbyl groups in which the substituent is a substituted amino group include an N,N-dimethylaminomethyl group, a 2-N,N-dimethylaminoethyl group, and a 3-N,N-dimethylaminopropyl group. Examples of the substituted hydrocarbyl groups in which the substituent is a hydrocarbyloxy group include a methoxymethyl group, a methoxyethyl group, and an ethoxymethyl group. Hydrocarbyl groups are preferred among the above examples; $C_{1-4}$ acyclic alkyl groups are more preferred; and a methyl group or an ethyl group is still more preferred.

Examples of the trihydrocarbylsilyl groups include a trimethylsilyl group, and a tert-butyl-dimethylsilyl group. A trimethylsilyl group is preferred.

The hydrocarbylene group optionally containing at least one, as a hetero atom, selected from the group consisting of a silicon atom, a nitrogen atom, and an oxygen atom refers to a hydrocarbylene group, or a hetero atom-containing hydrocarbylene group in which the hetero atom is at least one selected from the group consisting of a silicon atom, a nitrogen atom and an oxygen atom. Examples of the hetero atom-containing hydrocarbylene groups in which the hetero atom is at least one selected from the group consisting of a silicon atom, nitrogen atom and an oxygen atom include hetero atom-containing hydrocarbylene groups in which the hetero atom is a silicon atom, hetero atom-containing hydrocarbylene groups in which the hetero atom is a nitrogen atom, and hetero atom-containing hydrocarbylene groups in which the hetero atom is an oxygen atom. Examples of the hydrocarbylene groups include alkylene groups such as a tetramethylene group, a pentamethylene group, a hexamethylene group, a pent-2-ene-1,5-diyl group, and a 2,2,4-trimethylhexane-1,6-diyl group; and alkenediyl groups such as a pent-2-ene-1,5-diyl group, preferably alkylene groups, and more preferably $C_{4-7}$ alkylene groups. Examples of the hetero atom-containing hydrocarbylene groups in which the hetero atom is a silicon atom include a group represented by —Si$(CH_3)_2$—CH$_2$—CH$_2$—Si$(CH_3)_2$—. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include a group represented by —CH$_2$—CH$_2$—O—CH$_2$—CH$_2$—. Hydrocarbylene groups are preferred among the above examples; $C_{4-7}$ alkylene groups are more preferred; and a tetramethylene group, a pentamethylene group, and a hexamethylene group are still more preferred.

Preferably, each of $R^{12}$ and $R^{13}$ is a hydrocarbyl group, or $R^{12}$ and $R^{13}$ are bonded to each other to form a hydrocarbylene group. More preferably, each of $R^{12}$ and $R^{13}$ is a $C_{1-4}$ acyclic alkyl group, or $R^{12}$ and $R^{13}$ are bonded to each other to form a $C_{4-7}$ alkylene group. Still more preferably, each of $R^{12}$ and $R^{13}$ is a methyl group or an ethyl group.

M in the formula (I) represents an alkali metal atom. Examples of the alkali metal atoms include Li, Na, K, and Cs, preferably Li.

The polymerization initiator represented by the formula (I) in which i is 1 may be a compound formed from one to five isoprene-derived structural unit(s) polymerized with an aminoalkyllithium compound. Examples of the aminoalkyllithium compounds include N,N-dialkylaminoalkyllithiums such as 3-(N,N-dimethylamino)-1-propyllithium, 3-(N,N-diethylamino)-1-propyllithium, 3-(N,N-di-n-butylamino)-1-propyllithium, 4-(N,N-dimethylamino)-1-butyllithium, 4-(N,N-diethylamino)-1-butyllithium, 4-(N,N-di-n-propylamino)-1-butyllithium, and 3-(N,N-di-n-butylamino)-1-butyllithium; hetero atom-free cyclic aminoalkyllithium compounds such as 3-(1-pyrrolidino)-1-propyllithium, 3-(1-piperidino)-1-propyllithium, 3-(1-hexamethyleneimino)-1-propyllithium, and 3-[1-(1,2,3,6-tetrahydropyridino)]-1-propyllithium; and hetero atom-containing cyclic aminoalkyllithium compounds such as 3-(1-morpholino)-1-propyllithium, 3-(1-imidazolyl)-1-propyllithium, 3-(4,5-dihydro-1-imidazolyl)-1-propyllithium, and 3-(2,2,5,5-tetramethyl-1-aza-2,5-disila-1-cyclopentyl)-1-propyllithium, preferably N,N-dialkylaminoalkyllithiums, and more preferably 3-(N,N-dimethylamino)-1-propyllithium or 3-(N,N-diethylamino)-1-propyllithium.

Examples of the polymerization initiators represented by the formula (I) in which i is 0 include lithium hexamethyleneimide, lithium pyrrolidide, lithium piperidide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium di-2-ethylhexylamide, lithium didecylamide, lithium-N-methylpiperadide, lithium ethylpropylamide, lithium ethylbutylamide, lithium methylbutylamide, lithium ethylbenzylamide, and lithium methylphenethylamide.

The polymerization initiator represented by the formula (I) in which i is 0 may be prepared in advance from a secondary amine and a hydrocarbyllithium compound before it is used in the polymerization reaction, or may be prepared in the polymerization system. Examples of the secondary amines include dimethylamine, diethylamine, dibutylamine, dioctylamine, dicyclohexylamine, and diisobutylamine. Other examples thereof include cyclic amines such as azacycloheptane (i.e. hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, and 1,5,5-trimethyl-3-azabicyclo[4.4.0]decane.

The polymerization initiator represented by the formula (I) is preferably a compound in which i is 1, more preferably a compound formed from one to five isoprene-derived structural unit(s) polymerized with an N,N-aminoalkyllithium, and still more preferably a compound formed from one to five isoprene-derived structural unit(s) polymerized with 3-(N,N-dimethylamino)-1-propyllithium or 3-(N,N-diethylamino)-1-propyllithium.

The amount of the polymerization initiator represented by the formula (1) to be used is preferably 0.01 to 15 mmol, and more preferably 0.1 to 10 mmol, for each 100 g of the monomer component used in the polymerization.

In the present invention, other polymerization initiators, such as n-butyllithium, may be used in combination, if necessary.

Examples of the conjugated diene compounds include 1,3-butadiene, isoprene, 1,3-pentadiene, 2,3-dimethyl-1,3-butadiene, 1,3-hexadiene, and myrcene. These may be used alone or two or more of these may be used in combination. In view of easy availability, the conjugated diene compound is preferably 1,3-butadiene or isoprene.

The silicon-containing vinyl compound is preferably a compound represented by the following formula (II):

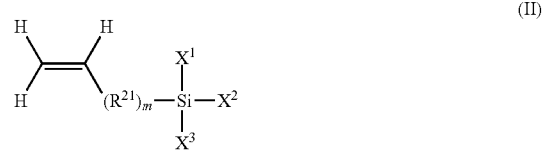

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

In the formula (II), m is 0 or 1, preferably 0.

The hydrocarbylene group in the formula (II) may be an alkylene group, an alkenediyl group, an arylene group, or a group in which an arylene group and an alkylene group are bonded. Examples of the alkylene groups include a methylene group, an ethylene group, and a trimethylene group. Examples of the alkenediyl groups include a vinylene group and an ethylene-1,1-diyl group. Examples of the arylene groups include a phenylene group, a naphthylene group, and a biphenylene group. Examples of the groups in which an arylene group and an alkylene group are bonded include a group in which a phenylene group and a methylene group are bonded, and a group in which a phenylene group and an ethylene group are bonded.

$R^{21}$ is preferably an arylene group, and more preferably a phenylene group.

In the formula (II), $X^1$, $X^2$ and $X^3$ each represent a substituted amino group, a hydrocarbyloxy group, or an optionally substituted hydrocarbyl group. Preferably, at least one of $X^1$, $X^2$ and $X^3$ is a substituted amino group. More preferably, two of $X^1$, $X^2$ and $X^3$ are substituted amino groups.

In the formula (II), the substituted amino group is preferably a group represented by the following formula (IIa):

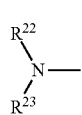

(IIa)

wherein $R^{22}$ and $R^{23}$ each represent an optionally substituted hydrocarbyl group or a trihydrocarbylsilyl group, or $R^{22}$ and $R^{23}$ are bonded to each other to form a hydrocarbylene group optionally containing a nitrogen atom and/or an oxygen atom as a hetero atom.

The optionally substituted hydrocarbyl group in the formula (IIa) refers to a hydrocarbyl group or a substituted hydrocarbyl group. The substituted hydrocarbyl group may be a substituted hydrocarbyl group in which the substituent is a hydrocarbyloxy group. Examples of the hydrocarbyl groups include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; cyclic alkyl groups such as a cyclopentyl group and a cyclohexyl group; and aryl groups such as a phenyl group, a benzyl group, and a naphthyl group, preferably acyclic alkyl groups, and more preferably a methyl group or an ethyl group. Examples of the substituted hydrocarbyl groups in which the substituent is a hydrocarbyloxy group include alkoxyalkyl groups such as a methoxymethyl group, an ethoxymethyl group, and a methoxyethyl group; and aryloxyalkyl groups such as a phenoxymethyl group.

Examples of the trihydrocarbylsilyl groups in the formula (IIa) include trialkylsilyl groups such as a trimethylsilyl group, a triethylsilyl group, and a tert-butyldimethylsilyl group.

The hydrocarbylene group optionally containing a nitrogen atom and/or an oxygen atom as a hetero atom in the formula (IIa) refers to a hydrocarbylene group, or a hetero atom-containing hydrocarbylene group in which the hetero atom is a nitrogen atom and/or an oxygen atom. The hetero atom-containing hydrocarbylene group in which the hetero atom is a nitrogen atom and/or an oxygen atom may be a hydrocarbylene group containing a nitrogen atom as a hetero atom, or a hydrocarbylene group containing an oxygen atom as a hetero atom. Examples of the hydrocarbylene groups include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; and alkenediyl groups such as a pent-2-ene-1,5-diyl group. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include a group represented by —CH$_2$—CH$_2$—O—CH$_2$—CH$_2$—.

Preferably, each of $R^{22}$ and $R^{23}$ is an alkyl group, or $R^{22}$ and $R^{23}$ are bonded to each other to form an alkylene group. Each of $R^{22}$ and $R^{23}$ is more preferably an alkyl group, and still more preferably a methyl group or an ethyl group.

Examples of the substituted amino groups represented by the formula (IIa) in which each of $R^{22}$ and $R^{23}$ is a hydrocarbyl group include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; and diarylamino groups such as a diphenylamino group, preferably dialkylamino groups, and more preferably a dimethylamino group, a diethylamino group, and a di-n-butylamino group. Examples of the substituted amino groups in which each of $R^{22}$ and $R^{23}$ is a substituted hydrocarbyl group in which the substituent is a hydrocarbyloxy group include di(alkoxyalkyl)amino groups such as a di(methoxymethyl)amino group and a di(ethoxymethyl)amino group. Examples of the substituted amino groups in which $R^{22}$ or $R^{23}$ is a trihydrocarbylsilyl group include trialkylsilyl group-containing amino groups such as a bis(trimethylsilyl)amino group, a bis(tert-butyldimethylsilyl)amino group, and an N-trimethylsilyl-N-methylamino group.

Examples of the substituted amino groups represented by the formula (IIa) in which $R^{22}$ and $R^{23}$ are bonded to each other to form a hydrocarbylene group include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group. Examples of the substituted amino groups with a hydrocarbylene group containing a nitrogen atom as a hetero atom include a 1-imidazolyl group and a 4,5-dihydro-1-imidazolyl group. Examples of the substituted amino groups with a hydrocarbylene group containing an oxygen atom as a hetero atom include a morpholino group.

The substituted amino group represented by the formula (IIa) is preferably a dialkylamino group or a 1-alkyleneimino group; more preferably a dialkylamino group; and still more preferably a dimethylamino group, a diethylamino group, or a di-n-butylamino group.

Examples of the hydrocarbyloxy groups in the formula (II) include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group.

The optionally substituted hydrocarbyl group in the formula (II) refers to a hydrocarbyl group or a substituted hydrocarbyl group. The substituted hydrocarbyl group may be a substituted hydrocarbyl group in which the substituent is a hydrocarbyloxy group. Examples of the hydrocarbyl groups include alkyl groups such as a methyl group, an ethyl group, an n-propyl group, an isopropyl group, an n-butyl group, a sec-butyl group, and a tert-butyl group; and aryl groups such as a phenyl group, a 4-methyl-1-phenyl group, and a benzyl group. Examples of the substituted hydrocarbyl groups in which the substituent is a hydrocarbyloxy group include alkoxyalkyl groups such as a methoxymethyl group, an ethoxymethyl group, and an ethoxyethyl group.

Examples of the silicon-containing vinyl compounds represented by the formula (II) in which one of $X^1$, $X^2$, and $X^3$ is a substituted amino group, and m is 0 include: (dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino)diethylvinylsilane, (ethylmethylamino)diethylvinylsilane, (di-n-propylamino)diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxyalkyl)vinylsilanes such as (dimethylamino)di(methoxymethyl)vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl)vinylsilane, and (diethylamino)di(ethoxyethyl)vinylsilane; and cyclic aminodialkylvinylsilane compounds such as pyrrolidinodimethylvinylsilane, piperidinodimethylvinylsilane, hexamethyleneiminodimethylvinylsilane, 4,5-dihydroimidazolyldimethylvinylsilane, and morpholinodimethylvinylsilane.

Examples of the silicon-containing vinyl compounds represented by the formula (II) in which one of $X^1$, $X^2$, and $X^3$ is a substituted amino group, and m is 1 include (dialkylamino)dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane.

Examples of the silicon-containing vinyl compounds represented by the formula (II) in which two of $X^1$, $X^2$, and $X^3$ are substituted amino groups, and m is 0 include: bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(diethylamino)ethoxyethylvinylsilane; and bis(cyclic amino)alkylvinylsilane compounds such as bis(pyrrolidino)methylvinylsilane, bis(piperidino)methylvinylsilane, bis(hexamethyleneimino)methylvinylsilane, bis(4,5-dihydroimidazolyl)methylvinylsilane, and bis(morpholino)methylvinylsilane.

Examples of the silicon-containing vinyl compounds represented by the formula (II) in which two of $X^1$, $X^2$, and $X^3$ are substituted amino groups, and m is 1 include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane.

Examples of the silicon-containing vinyl compounds represented by the formula (II) in which the three of $X^1$, $X^2$, and $X^3$ are substituted amino groups, and m is 0 include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane.

Examples of the silicon-containing vinyl compounds represented by the formula (II) in which the three of $X^1$, $X^2$, and $X^3$ are substituted amino groups, and m is 1 include tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane.

Examples of the silicon-containing vinyl compounds represented by the formula (II) in which each of $X^1$, $X^2$, and $X^3$ is not a substituted amino group, and m is 0 include: trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; and substituted alkoxyvinylsilane compounds such as tris(β-methoxyethoxy)vinylsilane.

Other examples of the silicon-containing vinyl compounds include bis(trialkylsilyl)aminostyrenes such as 4-N,N-bis(trimethylsilyl)aminostyrene and 3-N,N-bis(trimethylsilyl)aminostyrene; and bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, and 3-bis(trimethylsilyl)aminoethylstyrene.

The silicon-containing vinyl compound is preferably a compound represented by the formula (II), more preferably a compound represented by the formula (II) in which m is 0, and still more preferably a compound represented by the formula (II) in which two of $X^1$, $X^2$ and $X^3$ are dialkyl amino groups.

The silicon-containing vinyl compound is particularly preferably bis(dimethylamino)methylvinylsilane, bis(diethylamino)methylvinylsilane, or bis(di-n-butylamino)methylvinylsilane.

The amount of the silicon-containing vinyl compound used in the production of the conjugated diene polymer is preferably not less than 0.01% by mass, more preferably not less than 0.02% by mass, and still more preferably not less than 0.05% by mass, based on 100% by mass of the total amount of the monomer component used in the polymerization in terms of achieving a balanced enhancement in fuel economy, abrasion resistance, and processability. The amount is preferably not more than 20% by mass, more preferably not more than 2% by mass, and still more preferably not more than 1% by mass in terms of increasing cost efficiency and abrasion resistance.

In the production of the conjugated diene polymer, the monomer component may further include polymerizable monomers, in addition to the conjugated diene compound and silicon-containing vinyl compound. Examples of these monomers include aromatic vinyl compounds, vinyl nitriles, and unsaturated carboxylic acid esters. Examples of the aromatic vinyl compounds include styrene, α-methylstyrene, vinyltoluene, vinylnaphthalene, divinylbenzene, trivinylbenzene, and divinylnaphthalene. Examples of the vinyl nitriles include acrylonitrile. Examples of the unsaturated carboxylic acid esters include methyl acrylate, ethyl acrylate, methyl methacrylate, and ethyl methacrylate. Aromatic vinyl compounds, more preferably styrene, are preferred among the above examples.

In the case where an aromatic vinyl compound is used in the production of the conjugated diene polymer, the amount of the aromatic vinyl compound based on 100% by mass of the combined amount of the conjugated diene compound and the aromatic vinyl compound is preferably not less than 10% by mass (the amount of the conjugated diene compound is not more than 90% by mass), and more preferably not less than 15% by mass (the amount of the conjugated diene compound is not more than 85% by mass). Moreover, from the viewpoint of fuel economy, the amount of the aromatic vinyl compound is preferably not more than 50% by mass (the amount of the conjugated diene compound is not less than 50% by mass), and more preferably not more than 45% by mass (the amount of the conjugated diene compound is not less than 55% by mass).

In the production of the conjugated diene polymer, polymerization is preferably performed in a hydrocarbon solvent. Hydrocarbon solvents do not inactivate the polymerization initiator represented by the formula (I). Examples of the hydrocarbon solvents include aliphatic hydrocarbons, aromatic hydrocarbons, and alicyclic hydrocarbons. Examples of the aliphatic hydrocarbons include propane, n-butane, isobutane, n-pentane, iso-pentane, n-hexane, n-heptane, and n-octane. Examples of the aromatic hydrocarbons include benzene, toluene, xylene, and ethylbenzene. Examples of the alicyclic hydrocarbons include cyclopentane and cyclohexane. The hydrocarbon solvent may be a mixture of different components, such as industrial hexane. It is preferably a $C_{2-12}$ hydrocarbon.

The polymerization reaction may be performed in the presence of an agent for adjusting the vinyl bond content in conjugated diene units, or an agent for adjusting the distribution of a conjugated diene unit and a monomer unit based on a monomer other than conjugated dienes in conjugated diene polymer chains (hereinafter, referred to collectively as "adjusting agents"). Examples of the agents include ether compounds, tertiary amine compounds, and phosphine compounds. Examples of the ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amine compounds include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. One or more of them may be used.

In the production of the conjugated diene polymer, the polymerization initiator may be supplied to a polymerization reactor before the monomer component is supplied to the polymerization reactor; or the polymerization initiator may be supplied to a polymerization reactor after the whole amount of the monomer component used in the polymerization is supplied to the polymerization reactor; or the polymerization initiator may be supplied to a polymerization reactor after a part of the monomer component used in the polymerization is supplied to the polymerization reactor. Moreover, the polymerization initiator may be supplied at once or continuously to the polymerization reactor.

In the production of the conjugated diene polymer, the monomer component may be supplied at once, continuously, or intermittently to the polymerization reactor. Moreover, monomers may be supplied individually or simultaneously to the polymerization reactor.

In the production of the conjugated diene polymer, the polymerization temperature is usually 25 to 100° C., preferably 35 to 90° C., and more preferably 50 to 80° C. The polymerization time usually ranges from 10 minutes to 5 hours.

The conjugated diene polymer is obtained by polymerizing a monomer component including a conjugated diene compound and a silicon-containing vinyl compound in the presence of a polymerization initiator represented by the formula (I) to produce a copolymer, and then reacting a compound containing a nitrogen atom and/or a silicon atom with an active terminal of the copolymer (the active terminal of the copolymer is considered to contain an alkali metal derived from the polymerization initiator) (terminal modification reaction). More specifically, the conjugated diene polymer is obtained by adding the compound containing a nitrogen atom and/or a silicon atom to the polymerization solution and then mixing them. The amount of the compound containing a nitrogen atom and/or a silicon atom to be added to the polymerization solution is usually 0.1 to 3 mol, preferably 0.5 to 2 mol, and more preferably 0.7 to 1.5 mol, per mol of the alkali metal derived from the polymerization initiator represented by the formula (I).

The terminal modification reaction is usually performed at a temperature of 25 to 100° C., preferably 35 to 90° C., and more preferably 50 to 80° C. The time period for the reaction is usually 60 seconds to 5 hours, preferably 5 minutes to 1 hour, and more preferably 15 minutes to 1 hour.

Preferred examples of the compound containing a nitrogen atom and/or a silicon atom include compounds containing a nitrogen atom and a carbonyl group.

The compound containing a nitrogen atom and a carbonyl group is preferably a compound represented by the following formula (III):

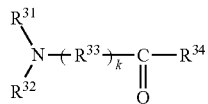
(III)

wherein $R^{31}$ represents an optionally substituted hydrocarbyl group, or is joined to $R^{32}$ to form a hydrocarbylene group optionally containing a nitrogen atom and/or an oxygen atom as a hetero atom, or is joined to $R^{34}$ to form a divalent group; $R^{32}$ represents an optionally substituted hydrocarbyl group, or is joined to $R^{31}$ to form a hydrocarbylene group optionally containing a nitrogen atom and/or an oxygen atom as a hetero atom; and $R^{34}$ represents an optionally substituted hydrocarbyl group or a hydrogen atom, or is joined to $R^{31}$ to form a divalent group; $R^{33}$ represents a divalent group; and k represents 0 or 1.

In the formula (III), the optionally substituted hydrocarbyl group for $R^{31}$, $R^{32}$ or $R^{34}$ refers to a hydrocarbyl group or a substituted hydrocarbyl group. The substituted hydrocarbyl group may be a substituted hydrocarbyl group in which the substituent is a hydrocarbyloxy group, or a substituted hydrocarbyl group in which the substituent is a substituted amino group. Examples of the hydrocarbyl groups include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. Examples of the substituted hydrocarbyl groups in which the substituent is a hydrocarbyloxy group include alkoxyalkyl groups such as a methoxymethyl group, an ethoxymethyl group, and an ethoxyethyl group. Examples of the substituted hydrocarbyl groups in which the substituent is a substituted amino group include (N,N-dialkylamino)alkyl groups such as a 2-(N,N-dimethylamino) ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-(N,N-dimethylamino)ethylphenyl group; cyclic amino group-containing alkyl groups such as a 3-pyrrolidinopropyl group, a 3-piperidinopropyl group, and a 3-imidazolylpropyl group; cyclic amino group-containing aryl groups such as a 4-pyrrolidinophenyl group, a 4-piperidinophenyl group, and a 4-imidazolylphenyl group; and cyclic amino group-containing alkylaryl groups such as a 4-pyrrolidinoethylphenyl group, a 4-piperidinoethylphenyl group, and a 4-imidazolylethylphenyl group.

In the formula (III), the hydrocarbylene group optionally containing a nitrogen atom and/or an oxygen atom as a hetero atom, formed by joining $R^{31}$ and $R^{32}$ refers to a hydrocarbylene group or a hetero atom-containing hydrocarbylene group in which the hetero atom is a nitrogen atom and/or an oxygen atom. The hetero atom-containing hydrocarbylene group in which the hetero atom is a nitrogen atom and/or an oxygen atom may be a hetero atom-containing hydrocarbylene group in which the hetero atom is a nitrogen atom or a hetero atom-containing hydrocarbylene group in which the hetero atom is an oxygen atom. Examples of the hydrocarbylene groups include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include groups represented by —(CH$_2$)$_s$—O—(CH$_2$)$_t$— where s and t each represent an integer of 1 or more.

In the formula (III), each of the divalent group formed by joining $R^{31}$ and $R^{34}$, and the divalent group for $R^{33}$ may be a hydrocarbylene group, a hetero atom-containing hydrocarbylene group in which the hetero atom is a nitrogen atom, a hetero atom-containing hydrocarbylene group in which the hetero atom is an oxygen atom, a group in which a hydrocarbylene group and an oxygen atom are bonded, or a group in which a hydrocarbylene group and a group represented by —NR$^{35}$— (wherein R$^{35}$ represents a hydrocarbyl group or a hydrogen atom) are bonded. Examples of the hydrocarbylene groups include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include groups represented by —(CH$_2$)$_s$—O—(CH$_2$)$_t$— where s and t each represent an integer of 1 or more. Examples of the groups in which a hydrocarbylene group and an oxygen atom are bonded include groups represented by —(CH$_2$)$_r$—O— where r represents an integer of 1 or more. Examples of the groups in which a hydrocarbylene group and a group represented by —NR$^{35}$— (wherein R$^{35}$ represents a hydrocarbyl group or a hydrogen atom) are bonded include groups represented by —(CH$_2$)$_p$—NR$^{35}$— where R$^{35}$ represents a hydrocarbyl group (preferably a C$_{1-6}$ hydrocarbyl group), or a hydrogen atom; and p represents an integer of 1 or more.

Preferred examples of the compound represented by the formula (III) include compounds represented by the formula (III) in which k is 0, and $R^{34}$ is an optionally substituted hydrocarbyl group or a hydrogen atom, represented by the following formula (IIIa):

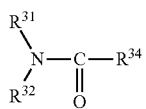
(IIIa)

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; and $R^{34}$ represents an optionally substituted hydrocarbyl group or a hydrogen atom.

In the formula (IIIa), the description and examples of the optionally substituted hydrocarbyl group for $R^{31}$, $R^{32}$ or $R^{34}$, and the hydrocarbylene group optionally containing a nitrogen atom and/or an oxygen atom as a hetero atom, formed by joining $R^{31}$ and $R^{32}$, are the same as described for the formula (III).

In the formula (IIIa), preferably, $R^{31}$ is a $C_{1-10}$ hydrocarbyl group, or is joined to $R^{32}$ to form a $C_{3-10}$ hydrocarbylene group or a hetero atom-containing $C_{3-10}$ hydrocarbylene group in which the hetero atom is a nitrogen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH=N—CH=CH—, or a group represented by —CH=N—CH$_2$—CH$_2$—. $R^{31}$ is still more preferably a $C_{1-6}$ alkyl group, and particularly preferably a methyl group or an ethyl group.

In the formula (IIIa), preferably, $R^{32}$ is a $C_{1-10}$ hydrocarbyl group, or is joined to $R^{31}$ to form a $C_{3-10}$ hydrocarbylene group or a hetero atom-containing $C_{3-10}$ hydrocarbylene group in which the hetero atom is a nitrogen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH=N—CH=CH—, or a group represented by —CH=N—CH$_2$—CH$_2$—. $R^{32}$ is still more preferably a $C_{1-6}$ alkyl group, and particularly preferably a methyl group or an ethyl group.

In the formula (IIIa), $R^{34}$ is preferably a hydrocarbyl group or a hydrogen atom, more preferably a $C_{1-10}$ hydrocarbyl group or a hydrogen atom, still more preferably a $C_{1-6}$ alkyl group or a hydrogen atom, and particularly preferably a hydrogen atom, a methyl group or an ethyl group.

Examples of the compounds represented by the formula (IIIa) in which $R^{34}$ is a hydrocarbyl group include N,N-dihydrocarbylacetamides such as N,N-dimethylacetamide, N,N-diethylacetamide, and N-methyl-N-ethylacetamide; N,N-dihydrocarbylacrylamides such as N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Examples of the compounds represented by the formula (IIIa) in which $R^{34}$ is a hydrogen atom include N,N-dihydrocarbylformamides such as N,N-dimethylformamide, N,N-dimethylformamide, and N-methyl-N-ethylformamide.

Preferred examples of the compound represented by the formula (III) include compounds represented by the formula (III) in which k is 0, and $R^{34}$ is joined to $R^{31}$ to form a divalent group, represented by the following formula (IIIb):

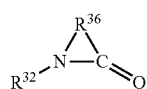

(IIIb)

wherein $R^{32}$ represents an optionally substituted hydrocarbyl group; and $R^{36}$ represents a hydrocarbylene group, or a group in which a hydrocarbylene group and a group represented by —NR$^{35}$— are bonded, where $R^{35}$ represents a hydrocarbyl group or a hydrogen atom.

In the formula (IIIb), the description and examples of the optionally substituted hydrocarbyl group for $R^{32}$ are the same as described for the formula (III).

In the formula (IIIb), examples of the hydrocarbylene groups for $R^{36}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the groups in which a hydrocarbylene group and a group represented by —NR$^{35}$— (wherein $R^{35}$ represents a hydrocarbyl group or a hydrogen atom) are bonded for $R^{36}$ include groups represented by —(CH$_2$)$_p$—NR$^{35}$— where $R^{35}$ represents a hydrocarbyl group or a hydrogen atom, and p represents an integer of 1 or more.

In the formula (IIIb), $R^{32}$ is preferably a $C_{1-10}$ hydrocarbyl group, more preferably a $C_{1-10}$ alkyl group or a $C_{6-10}$ aryl group, still more preferably a $C_{1-6}$ alkyl group or a phenyl group, and particularly preferably a methyl group, an ethyl group, or a phenyl group.

In the formula (IIIb), $R^{36}$ is preferably a $C_{1-10}$ hydrocarbylene group, or a group in which a $C_{1-10}$ hydrocarbylene group and a group represented by —NR$^{35}$— (wherein $R^{35}$ represents a hydrocarbyl group (preferably a $C_{1-10}$ hydrocarbyl group) or a hydrogen atom) are bonded, more preferably a $C_{3-6}$ alkylene group or a group represented by —(CH$_2$)$_p$—NR$^{35}$— (wherein $R^{35}$ represents a hydrocarbyl group (preferably a $C_{1-10}$ hydrocarbyl group), and p represents an integer of 1 or more (preferably an integer of 2 to 5)), and further preferably a trimethylene group, a tetramethylene group, a pentamethylene group, or a group represented by —(CH$_2$)$_2$—N(CH$_3$)—.

Examples of the compounds represented by the formula (IIIb) in which $R^{36}$ is a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ε-caprolactams such as N-methyl-ε-caprolactam and N-phenyl-ε-caprolactam; and N-hydrocarbyl-ω-laurilolactams such as N-methyl-ω-laurilolactam and N-vinyl-ω-laurilolactam. N-phenyl-2-pyrrolidone and N-methyl-ε-caprolactam are preferred among the above examples.

Examples of the compounds represented by the formula (IIIb) in which $R^{36}$ is a group in which a hydrocarbylene group and a group represented by —NR$^{35}$— (wherein $R^{35}$ represents a hydrocarbyl group or a hydrogen atom) are bonded include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. Preferred among the above examples is 1,3-dimethyl-2-imidazolidinone.

Preferred examples of the compound represented by the formula (III) include compounds represented by the formula (III) in which k is 1, and $R^{33}$ is a hydrocarbylene group, represented by the following formula (IIIc):

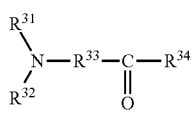

(IIIc)

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; $R^{33}$ represents a hydrocarbylene group; and $R^{34}$ represents an optionally substituted hydrocarbyl group or a hydrogen atom.

In the formula (IIIc), the description and examples of the optionally substituted hydrocarbyl group for $R^{31}$, $R^{32}$ or $R^{34}$, the hydrocarbylene group optionally containing a nitrogen atom and/or an oxygen atom as a hetero atom, formed by joining $R^{31}$ and $R^{32}$, and the hydrocarbylene group for $R^{33}$ are the same as described for the formula (III).

In the formula (IIIc), $R^{33}$ is preferably a $C_{1-10}$ hydrocarbylene group, more preferably a $C_{1-10}$ alkylene group or a $C_{6-10}$ arylene group, still more preferably a $C_{1-6}$ alkylene group or a phenylene group, and particularly preferably an ethylene group, a trimethylene group, or a 1,4-phenylene group.

In the formula (IIIc), $R^{34}$ is preferably a $C_{1-10}$ hydrocarbyl group, or a substituted $C_{1-10}$ hydrocarbyl group in which the substituent is a dialkylamino group, more preferably a $C_{1-6}$ alkyl group, a $C_{6-10}$ aryl group, a $C_{1-6}$ dialkylaminoalkyl group, or a $C_{6-10}$ dialkylaminoaryl group, and still more preferably a methyl group, an ethyl group, a phenyl group, a 3-dimethylaminoethyl group, or a 4-diethylaminophenyl group.

In the formula (IIIc), preferably, $R^{31}$ is a $C_{1-10}$ hydrocarbyl group, or is joined to $R^{32}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{31}$ is a $C_{1-6}$ alkyl group, or is joined to $R^{32}$ to form a $C_{3-6}$ alkylene group, a group represented by —CH=N—CH=CH—, or a group represented by —CH=N—CH$_2$—CH$_2$—. Particularly preferably, $R^{31}$ is a methyl group or an ethyl group, or is joined to $R^{32}$ to form a tetramethylene group, a hexamethylene group, or a group represented by —CH=N—CH=CH—.

In the formula (IIIc), preferably, $R^{32}$ is a $C_{1-10}$ hydrocarbyl group, or is joined to $R^{31}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{32}$ is a $C_{1-6}$ alkyl group, or is joined to $R^{31}$ to form a $C_{3-6}$ alkylene group, a group represented by —CH=N—CH=CH—, or a group represented by —CH=N—CH$_2$—CH$_2$—. Particularly preferably, $R^{32}$ is a methyl group or an ethyl group, or is joined to $R^{31}$ to form a tetramethylene group, a hexamethylene group, or a group represented by —CH=N—CH=CH—.

Examples of the compounds represented by the formula (IIIc) in which $R^{34}$ is a hydrocarbyl group include 4-N,N-dihydrocarbylaminoacetophenones such as 4-(N,N-dimethylamino)acetophenone, 4-N-methyl-N-ethylaminoacetophenone, and 4-N,N-diethylaminoacetophenone; and 4-cyclic-aminoacetophenone compounds such as 4'-(imidazol-1-yl)acetophenone and 4-pyrazolylacetophenone. Preferred among the above examples are 4-cyclic-aminoacetophenone compounds, with 4'-(imidazol-1-yl)acetophenone being more preferred.

Examples of the compounds represented by the formula (IIIc) in which $R^{34}$ is a substituted hydrocarbyl group include bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-di-t-butylaminobenzophenone, and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone, and 4,4'-bis(diphenylamino)benzophenone. Preferred among the above examples are 4,4'-bis(dihydrocarbylamino)benzophenones, with 4,4'-bis(diethylamino)benzophenone being more preferred.

Preferred examples of the compound represented by the formula (III) include compounds represented by the formula (III) in which k is 1, and $R^{33}$ is a group in which a hydrocarbylene group and an oxygen atom are bonded, or a group in which a hydrocarbylene group and a group represented by —NR$^{35}$— (wherein $R^{35}$ represents a hydrocarbyl group or a hydrogen atom) are bonded, represented by the following formula (IIId):

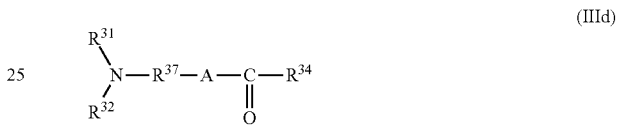

(IIId)

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; $R^{37}$ represents a hydrocarbylene group; A represents an oxygen atom or —NR$^{35}$— wherein $R^{35}$ represents a hydrocarbyl group or a hydrogen atom; and $R^{34}$ represents an optionally substituted hydrocarbyl group or a hydrogen atom.

In the formula (IIId), the description and examples of the optionally substituted hydrocarbyl group for $R^{31}$, $R^{32}$ or $R^{34}$, and the hydrocarbylene group optionally containing a nitrogen atom and/or an oxygen atom as a hetero atom, formed by joining $R^{31}$ and $R^{32}$, are the same as described for the formula (III). The hydrocarbyl group for $R^{35}$ is as described for the hydrocarbyl group for $R^{31}$, $R^{32}$, or $R^{34}$.

In the formula (IIId), A is preferably an oxygen atom or a group represented by —NR$^{35}$— (wherein $R^{35}$ is a hydrocarbyl group (preferably a $C_{1-5}$ hydrocarbyl group) or a hydrogen atom), more preferably an oxygen atom or a group represented by —NH—, and still more preferably a group represented by —NH—.

In the formula (IIId), examples of the hydrocarbylene groups for $R^{37}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group.

In the formula (IIId), $R^{34}$ is preferably a $C_{1-10}$ hydrocarbyl group, more preferably a $C_{2-5}$ alkenyl group, and still more preferably a vinyl group.

In the formula (IIId), $R^{37}$ is preferably a $C_{1-10}$ hydrocarbylene group, more preferably a $C_{1-6}$ alkylene group, still more preferably an ethylene group or a trimethylene group, and particularly preferably a trimethylene group.

In the formula (IIId), preferably, $R^{31}$ is a $C_{1-10}$ hydrocarbyl group, or is joined to $R^{32}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{31}$ is a $C_{1-6}$ alkyl group, or is joined to $R^{32}$ to form a $C_{3-6}$ alkylene group, a group represented by —CH=N—CH=CH—, or a group represented by —CH=N—CH$_2$—CH$_2$—. Particularly preferably, $R^{31}$ is a methyl group or an ethyl group, or is joined to $R^{32}$ to form a tetramethylene group, a hexamethylene group, or a group represented by —CH=N—CH=CH—.

In the formula (IIId), preferably, $R^{32}$ is a $C_{1-10}$ hydrocarbyl group, or is joined to $R^{31}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{32}$ is a $C_{1-6}$ alkyl group, or is joined to $R^{31}$ to form a $C_{3-6}$ alkylene group, a group represented by —CH=N—CH=CH—, or a group represented by —CH=N—CH$_2$—CH$_2$—. Particularly preferably, $R^{32}$ is a methyl group or an ethyl group, or is joined to $R^{31}$ to form a tetramethylene group, a hexamethylene group, or a group represented by —CH=N—CH=CH—.

Examples of the compounds represented by the formula (IIId) in which A is an oxygen atom include 2-N,N-dihydrocarbylaminoethyl acrylates such as 2-N,N-dimethylaminoethyl acrylate and 2-N,N-diethylaminoethyl acrylate; 3-N,N-dihydrocarbylaminopropyl acrylates such as 3-N,N-dimethylaminopropyl acrylate; 2-N,N-dihydrocarbylaminoethyl methacrylates such as 2-N,N-dimethylaminoethyl methacrylate and 2-N,N-diethylaminoethyl methacrylate; and 3-N,N-dihydrocarbylaminopropyl methacrylates such as 3-N,N-dimethylaminopropyl methacrylate. Preferred are 3-N,N-dihydrocarbylaminopropyl acrylates, with 3-N,N-dimethylaminopropyl acrylate being more preferred.

Examples of the compounds represented by the formula (IIId) in which A is a group represented by —NR$^{35}$— (wherein R$^{35}$ represents a hydrocarbyl group or a hydrogen atom) include N,N-dihydrocarbylaminoethyl acrylamides such as N,N-dimethylaminoethyl acrylamide and N,N-diethylaminoethyl acrylamide; N,N-dihydrocarbylaminopropyl acrylamides such as N,N-dimethylaminopropyl acrylamide and N,N-diethylaminopropyl acrylamide; N,N-dihydrocarbylaminobutyl acrylamides such as N,N-dimethylaminobutyl acrylamide and N,N-diethylaminobutyl acrylamide; N,N-dihydrocarbylaminoethyl methacrylamides such as N,N-dimethylaminoethyl methacrylamide and N,N-diethylaminoethyl methacrylamide; N,N-dihydrocarbylaminopropyl methacrylamides such as N,N-dimethylaminopropyl methacrylamide and N,N-diethylaminopropyl methacrylamide; and N,N-dihydrocarbylaminobutyl methacrylamides such as N,N-dimethylaminobutyl methacrylamide and N,N-diethylaminobutyl methacrylamide. Preferred are N,N-dihydrocarbylaminopropyl acrylamides, with N,N-dimethylaminopropyl acrylamide being more preferred.

The compound represented by the formula (III) is preferably a compound represented by the formula (IIId), particularly preferably an N,N-dihydrocarbylaminopropyl acrylamide, and most preferably N,N-dimethylaminopropyl acrylamide.

In addition to those described above, preferred examples of the compound containing a nitrogen atom and/or a silicon atom include alkoxysilyl group-containing compounds.

The alkoxysilyl group-containing compound is preferably a compound containing a nitrogen atom and an alkoxysilyl group, and more preferably a compound represented by the following formula (IV):

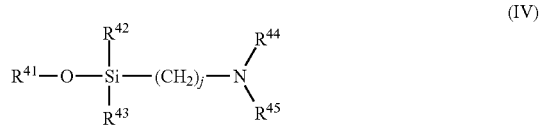

wherein $R^{41}$ represents a hydrocarbyl group; $R^{42}$ and $R^{43}$ each represent a hydrocarbyl group or a hydrocarbyloxy group; $R^{44}$ represents an optionally substituted hydrocarbyl group or a trihydrocarbylsilyl group, or is joined to $R^{45}$ to form a hydrocarbylene group optionally containing at least one, as a hetero atom, selected from the group consisting of a silicon atom, a nitrogen atom and an oxygen atom; $R^{45}$ represents an optionally substituted hydrocarbyl group or a trihydrocarbylsilyl group, or is joined to $R^{44}$ to form a hydrocarbylene group optionally containing at least one, as a hetero atom, selected from the group consisting of a silicon atom, a nitrogen atom and an oxygen atom; and j represents an integer of 1 to 5.

In the formula (IV), the optionally substituted hydrocarbyl group refers to a hydrocarbyl group or a substituted hydrocarbyl group. Examples of the hydrocarbyl groups include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group, preferably alkyl groups, and more preferably a methyl group or an ethyl group. Examples of the substituted hydrocarbyl groups include oxacycloalkyl groups such as an oxiranyl group and a tetrahydrofuranyl group, preferably a tetrahydrofuranyl group.

Herein, an oxacycloalkyl group refers to a group in which the CH$_2$ on an alicycle of a cycloalkyl group is replaced with an oxygen atom.

Examples of the hydrocarbyloxy groups include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group. Preferred are alkoxy groups, with a methoxy group or an ethoxy group being more preferred.

Examples of the trihydrocarbylsilyl groups include a trimethylsilyl group and a tert-butyl-dimethylsilyl group, preferably a trimethylsilyl group.

The hydrocarbylene group optionally containing at least one, as a hetero atom, selected from the group consisting of a silicon atom, a nitrogen atom and an oxygen atom refers to a hydrocarbylene group, or a hetero atom-containing hydrocarbylene group in which the hetero atom is at least one selected from the group consisting of a silicon atom, a nitrogen atom and an oxygen atom. The hetero atom-containing hydrocarbylene group in which the hetero atom is at least one selected from the group consisting of a silicon atom, a nitrogen atom and an oxygen atom may be a hetero atom-containing hydrocarbylene group in which the hetero atom is a silicon atom, a hetero atom-containing hydrocarbylene group in which the hetero atom is a nitrogen atom, or a hetero atom-containing hydrocarbylene group in which the hetero atom is an oxygen atom. Examples of the hydrocarbylene groups include alkylene groups such as a tetramethylene group, a pentamethylene group, a hexamethylene group, a pentan-2-en-1,5-diyl group, and a 2,2,4-trimethylhexane-1,6-diyl group. Preferred among them are $C_{4-7}$ alkylene groups, with a pentamethylene group or a hexamethylene group being particularly preferred. Examples of the hetero atom-containing hydrocarbylene groups in which the hetero atom is a silicon atom include a group represented by —Si(CH$_3$)$_2$—CH$_2$—CH$_2$—Si(CH$_3$)$_2$—. Examples of the hetero atom-containing hydrocarbylene groups in which the hetero atom is a nitrogen atom include a group represented by —CH=N—CH=CH—, and a group represented by —CH=N—CH$_2$—CH$_2$—. Examples of the hetero atom-containing hydrocarbylene groups in which the hetero atom is an oxygen atom include a group represented by —CH$_2$—CH$_2$—O—CH$_2$—CH$_2$—.

In the formula (IV), $R^{41}$ is preferably a $C_{1-4}$ alkyl group, and more preferably a methyl group or an ethyl group. Each of $R^{42}$ and $R^{43}$ is preferably a hydrocarbyloxy group, more preferably a $C_{1-4}$ alkoxy group, and still more preferably a methoxy group or an ethoxy group. Each of $R^{44}$ and $R^{45}$ is preferably a hydrocarbyl group, more preferably a $C_{1-4}$ alkyl group, and still more preferably a methyl group or an ethyl group. Moreover, j is preferably an integer of 2 to 4.

Examples of the compounds represented by the formula (IV) include [(dialkylamino)alkyl]alkoxysilane compounds such as 3-dimethylaminopropyltriethoxysilane, 3-dimethylaminopropyltrimethoxysilane, 3-diethylaminopropyltriethoxysilane, 3-diethylaminopropyltrimethoxysilane, 3-dimethylaminopropylmethyldiethoxysilane, 2-dimethylaminoethyltriethoxysilane, and 2-dimethylaminoethyltrimethoxysilane; cyclic aminoalkylalkoxysilane compounds such as hexamethyleneiminomethyltrimethoxysilane, 3-hexamethyleneiminopropyltriethoxysilane, N-(3-triethoxysilylpropyl)-4,5-dihydroimidazole, and N-(3-trimethoxysilylpropyl)-4,5-imidazole; [di(tetrahydrofuranyl)amino]alkylalkoxysilane compounds such as 3-[di(tetrahydrofuranyl)amino]propyltrimethoxysilane and 3-[di(tetrahydrofuranyl)amino]propyltriethoxysilane; and N,N-bis(trialkylsilyl)aminoalkylalkoxysilane compounds such as N,N-bis(trimethylsilyl) aminopropylmethyldimethoxysilane and N,N-bis (trimethylsilyl)aminopropylmethyldiethoxysilane. Preferred among the above examples are [(dialkylamino)alkyl]alkoxysilane compounds, with 3-dimethylaminopropyltriethoxysilane, 3-dimethylaminopropyltrimethoxysilane, 3-diethylaminopropyltriethoxysilane, and 3-diethylaminopropyltrimethoxysilane being more preferred.

Examples of the alkoxysilyl group-containing compounds include, in addition to the aforementioned compounds containing a nitrogen atom and an alkoxysilyl group, tetraalkoxysilanes such as tetramethoxysilane, tetraethoxysilane, and tetra-n-propoxysilane; trialkoxyhydrocarbylsilanes such as methyltrimethoxysilane, methyltriethoxysilane, ethyltrimethoxysilane, and phenyltrimethoxysilane; trialkoxyhalosilanes such as trimethoxychlorosilane, triethoxychlorosilane, and tri-n-propoxychlorosilane; dialkoxydihydrocarbylsilanes such as dimethoxydimethylsilane, diethoxydimethylsilane, and dimethoxydiethylsilane; dialkoxydihalosilanes such as dimethoxydichlorosilane, diethoxydichlorosilane, and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, and (3-glycidoxypropyl)methyldimethoxysilane; (3,4-epoxycyclohexyl)alkylalkoxysilane compounds such as 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane; alkoxysilylalkylsuccinic anhydrides such as 3-trimethoxysilylpropylsuccinic anhydride and 3-triethoxysilylpropylsuccinic anhydride; and (methacryloyloxyalkyl)alkoxysilane compounds such as 3-methacryloyloxypropyltrimethoxysilane and 3-methacryloyloxypropyltriethoxysilane.

The alkoxysilyl group-containing compound may contain a nitrogen atom and a carbonyl group. Examples of the compounds containing a nitrogen atom and a carbonyl group as well as an alkoxysilyl group include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate, and tris[3-(tributoxysilyl)propyl]isocyanurate. Preferred among them is tris [3-(trimethoxysilyl)propyl]isocyanurate.

Other examples of the compounds containing a nitrogen atom and/or a silicon atom include N,N-dialkyl-substituted carboxylic acid amide dialkyl acetal compounds. Examples of the N,N-dialkyl-substituted carboxylic acid amide dialkyl acetal compounds include N,N-dialkylformamide dialkyl acetals such as N,N-dimethylformamide dimethyl acetal and N,N-diethylformamide dimethyl acetal; N,N-dialkylacetamide dialkyl acetals such as N,N-dimethylacetamide dimethyl acetal and N,N-diethylacetamide dimethyl acetal; and N,N-dialkylpropionamide dialkyl acetals such as N,N-dimethylpropionamide dimethyl acetal and N,N-diethylpropionamide dimethyl acetal. Preferred among them are N,N-dialkylformamide dialkyl acetals, with N,N-dimethylformamide dimethyl acetal being more preferred.

In the method of producing the conjugated diene polymer, a coupling agent may be added to a solution of the conjugated diene polymer in a hydrocarbon at any time from the initiation of the polymerization of monomers before the recovery of the polymer described later. Examples of the coupling agents include compounds represented by the following formula (V):

$$R^{51}{}_a ML_{4-a} \tag{V}$$

wherein $R^{51}$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agents represented by the formula (V) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In terms of enhancing the processability of the conjugated diene polymer, the amount of the coupling agent to be added per mol of the alkali metal derived from an alkali metal catalyst is preferably not less than 0.03 mol and more preferably not less than 0.05 mol. In terms of enhancing fuel economy, the amount is preferably not more than 0.4 mol and more preferably not more than 0.3 mol.

In the method of producing the conjugated diene polymer, unreacted active terminals may be treated with alcohol, such as methanol or isopropyl alcohol, before the recovery of the polymer described later.

The conjugated diene polymer may be recovered from the solution of the conjugated diene polymer in a hydrocarbon by a known method. Examples of this method include (A) a method of adding a coagulant to the solution of the conjugated diene polymer in a hydrocarbon, and (B) a method of adding steam to the solution of the conjugated diene polymer in a hydrocarbon (steam stripping treatment). The recovered conjugated diene polymer may be dried with a known dryer, such as a band dryer or an extrusion dryer.

In terms of achieving a balanced enhancement in fuel economy, abrasion resistance, and processability, the amount of the structural unit derived from the polymerization initiator represented by the formula (I) in the conjugated diene polymer, when expressed per unit mass of the polymer, is preferably not less than 0.0001 mmol/g polymer, and more preferably not less than 0.001 mmol/g polymer, whereas it is preferably not more than 0.15 mmol/g polymer, and more preferably not more than 0.1 mmol/g polymer.

In terms of achieving a balanced enhancement in fuel economy, abrasion resistance, and processability, the amount of the structural unit derived from the silicon-containing vinyl compound in the conjugated diene polymer, when expressed per unit mass of the polymer, is preferably not less than 0.01 mmol/g polymer, and more preferably not less than 0.02 mmol/g polymer, whereas it is preferably not more than 0.4 mmol/g polymer, and more preferably not more than 0.2 mmol/g polymer.

In terms of achieving a balanced enhancement in fuel economy, abrasion resistance, and processability, the conjugated diene polymer preferably contains a structural unit derived from the compound represented by the formula (II). The structural unit derived from the compound represented by the formula (II) in the conjugated diene polymer refers to a structural unit represented by the following formula (IIb):

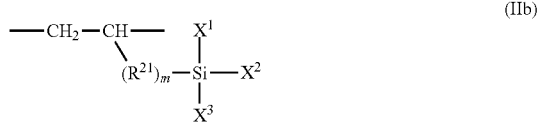
(IIb)

wherein m, $R^{21}$, $X^1$, $X^2$, and $X^3$ are as defined in the formula (II).

In the conjugated diene polymer in the present invention, preferably, at least one of $X^1$, $X^2$ and $X^3$ in the structural unit derived from the compound represented by the formula (II) is replaced by a hydroxy group, more preferably two or more of $X^1$, $X^2$ and $X^3$ are replaced by hydroxy groups, and still more preferably two of $X^1$, $X^2$ and $X^3$ are replaced by hydroxy groups. This can enhance the effects of improving fuel economy, abrasion resistance, and processability. Non-limiting examples of the method of replacing at least one of $X^1$, $X^2$, and $X^3$ with a hydroxy group include steam stripping treatment.

In terms of achieving a balanced enhancement in fuel economy, abrasion resistance, and processability, the conjugated diene polymer preferably contains a structural unit derived from an aromatic vinyl compound (aromatic vinyl unit). When the conjugated diene polymer contains an aromatic vinyl unit, the amount of the aromatic vinyl unit in the conjugated diene polymer, based on 100% by mass of the combined amount of the structural unit derived from the conjugated diene compound (conjugated diene unit) and the aromatic vinyl unit, is preferably not less than 10% by mass (the amount of the conjugated diene unit is not more than 90% by mass), and more preferably not less than 15% by mass (the amount of the conjugated diene unit is not more than 85% by mass). Also, from the viewpoint of fuel economy, the amount of the aromatic vinyl unit is preferably not more than 50% by mass (the amount of the conjugated diene unit is not less than 50% by mass), and more preferably not more than 45% by mass (the amount of the conjugated diene unit is not less than 55% by mass).

When the conjugated diene polymer contains a structural unit derived from an aromatic vinyl compound, in terms of fuel economy, the vinyl bond content (vinyl content) in the conjugated diene polymer is preferably not more than 80 mol %, and more preferably not more than 70 mol %, based on 100 mol % of the conjugated diene unit content. From the viewpoint of processability, the vinyl bond content is preferably not less than 10 mol %, more preferably not less than 15 mol %, still more preferably not less than 20 mol %, and particularly preferably not less than 40 mol %.

Particularly in terms of enhancing abrasion resistance, the conjugated diene polymer preferably contains no structural unit derived from an aromatic vinyl compound. In this case, the vinyl bond content (vinyl content) in the conjugated diene polymer is preferably not more than 20 mol %, and more preferably not more than 15 mol %, based on 100 mol % of the conjugated diene unit content.

The vinyl bond content in the conjugated diene polymer can be measured by the method described later in examples.

In terms of enhancing fuel economy, the molecular weight distribution of the conjugated diene polymer is preferably 1 to 5, and more preferably 1 to 2. The molecular weight distribution can be determined by measuring a number-average molecular weight (Mn) and a weight-average molecular weight (Mw) using gel permeation chromatography (GPC), and dividing Mw by Mn.

The conjugated diene polymer can be used as the rubber component in the rubber composition of the present invention.

The amount of the conjugated diene polymer based on 100% by mass of the rubber component is not less than 5% by mass, preferably not less than 15% by mass, and more preferably not less than 25% by mass. An amount less than 5% by mass tends not to easily achieve the effect of improving fuel economy. The amount of the conjugated diene polymer is not more than 45% by mass, preferably not more than 40% by mass. An amount more than 45% by mass tends not only to decrease abrasion resistance, but also to drive up the cost.

Suitable rubber materials that may be used in combination with the conjugated diene polymer in the rubber component are polyisoprene-based rubbers. If a polyisoprene-based rubber is added, then fuel economy can be further improved.

Examples of the polyisoprene-based rubbers include natural rubber (NR), and polyisoprene rubber (IR). The NR is not particularly limited, and examples thereof include those generally used in the tire industry, such as SIR20, RSS#3, TSR20, deproteinized natural rubber (DPNR), highly purified natural rubber (HPNR), and epoxidized natural rubber (ENR). Similarly, IRs generally used in the tire industry may be used.

In the case where the rubber composition of the present invention includes a polyisoprene-based rubber, the amount of the polyisoprene-based rubber based on 100% by mass of the rubber component is preferably not less than 10% by mass, more preferably not less than 25% by mass, and still more preferably not less than 35% by mass. If the amount is less than 10% by mass, fuel economy may not be sufficiently improved. The amount of the polyisoprene-based rubber is preferably not more than 80% by mass, more preferably not more than 70% by mass, and still more preferably not more than 60% by mass. If the amount of the polyisoprene-based rubber exceeds 80% by mass, processability may deteriorate.

Examples of applicable rubber materials other than polyisoprene-based rubbers include conventional rubbers such as styrene-butadiene copolymer rubber (SBR), polybutadiene rubber (BR), butadiene-isoprene copolymer rubber, and butyl rubber. Ethylene-propylene copolymers, ethylene-octene copolymers and the like may also be mentioned. Two or more kinds of the rubber materials may be used in combination. Suitable among these are those having at least 50% by mass of a structural unit derived from a conjugated diene compound, from the viewpoint of achieving a balanced improvement in fuel economy, abrasion resistance, and processability. Specifically, BR is preferred.

The BR is not particularly limited, and examples thereof include those generally used in the tire industry, including BRs with high cis content, such as BR1220 (produced by ZEON Corporation) and BR130B and BR150B (produced by Ube Industries, Ltd.); and syndiotactic polybutadiene crystal-containing BRs such as VCR412 and VCR617 (produced by Ube Industries, Ltd.).

When the rubber composition of the present invention contains BR, the amount of BR based on 100% by mass of the rubber component is preferably not less than 5% by mass, and more preferably not less than 10% by mass. If the amount is less than 5% by mass, sufficient abrasion resistance may not be achieved. The amount of BR is preferably not more than 30% by mass, and more preferably not more than 20% by mass. If the amount is more than 30% by mass, sufficient fuel economy may not be achieved.

The rubber composition of the present invention contains silica. Non-limiting examples of the silicas include dry silica (anhydrous silica) and wet silica (hydrous silica). Wet silica is preferred because it has more silanol groups.

The silica preferably has a nitrogen adsorption specific surface area ($N_2SA$) of not less than 20 $m^2/g$, more preferably not less than 30 $m^2/g$. If the silica has a $N_2SA$ less than 20 $m^2/g$, the silica tends to have a little reinforcement, and thus abrasion resistance and tensile strength tend to decrease. Also, the silica preferably has a $N_2SA$ of not more than 400 $m^2/g$, more preferably not more than 360 $m^2/g$, and still more preferably not more than 300 $m^2/g$. A silica with a $N_2SA$ more than 400 $m^2/g$ tends not to easily disperse, and thus fuel economy and processability tend to deteriorate.

The $N_2SA$ of silica is determined by the BET method in accordance with ASTM D3037-93.

The amount of silica (the combined amount if two or more kinds of silica are used) for each 100 parts by mass of the rubber component is not less than 5 parts by mass, preferably not less than 15 parts by mass. If the amount is less than 5 parts by mass, the effect of silica added tends not to be sufficiently achieved, and thus abrasion resistance tends to decrease. The amount of silica is not more than 100 parts by mass, preferably not more than 80 parts by mass, and more preferably not more than 60 parts by mass. If the amount exceeds 100 parts by mass, processability tends to deteriorate.

Two or more kinds of silica are preferably used in combination although one kind of silica may be used alone. A combination of silica (1) having a nitrogen adsorption specific surface area of at least 40 $m^2/g$ but less than 120 $m^2/g$, and silica (2) having a nitrogen adsorption specific surface area of not less than 120 $m^2/g$ is more preferred. When the silica (1) and the silica (2) are used together with the conjugated diene polymer, the silica (1) and the silica (2) disperse so well that the effects of improving the properties can be synergistically enhanced. Further, when the silica (1) and the silica (2) are used together with a mercapto group-containing silane coupling agent or a specific liquid resin, which are described later, the effects of improving the properties can further be enhanced.

The $N_2SAs$ of silica (1) and silica (2) preferably satisfy the inequality: ($N_2SA$ of silica (2))/($N_2SA$ of silica (1))$\geq$1.4, more preferably the inequality: ($N_2SA$ of silica (2))/($N_2SA$ of silica (1))$\geq$2.0. If the ratio is less than 1.4, the difference in particle size between the silica (1) and the silica (2) is small, and thus such a blend of two kinds of silica tends not to sufficiently provide a dispersibility-improving effect.

The silica (1) has a $N_2SA$ of not less than 40 $m^2/g$, preferably not less than 50 $m^2/g$. If the silica (1) has a $N_2SA$ of less than 40 $m^2/g$, the silica may have an insufficient reinforcement, so that abrasion resistance may be reduced. The silica (1) has a $N_2SA$ of less than 120 $m^2/g$, preferably not more than 115 $m^2/g$. If the silica (1) has a $N_2SA$ of not less than 120 $m^2/g$, the effect of a combination of the silica (1) and the silica (2) may not be sufficiently achieved.

The silica (2) has a $N_2SA$ of not less than 120 $m^2/g$, preferably not less than 150 $m^2/g$. If the silica (2) has a $N_2SA$ of less than 120 $m^2/g$, the effect of a combination of the silica (1) and the silica (2) may not be sufficiently achieved. The silica (2) preferably has a $N_2SA$ of not more than 250 $m^2/g$, more preferably not more than 220 $m^2/g$. If the silica (2) has a $N_2SA$ more than 250 $m^2/g$, fuel economy and processability tend to deteriorate.

The amounts of silica (1) and silica (2) preferably satisfy the following inequalities:

$$(\text{Amount of silica (1)}) \times 0.06 \leq (\text{Amount of silica (2)}) \leq (\text{Amount of silica (1)}) \times 15.$$

If the amount of silica (2) is less than 0.06 times the amount of silica (1), a sufficient rubber strength tends not to be achieved. If the amount of silica (2) is more than 15 times the amount of silica (1), rolling resistance tends to increase. The amount of silica (2) is more preferably at least 0.3 times the amount of silica (1), and still more preferably at least 0.4 times the amount of silica (1). Also, the amount of silica (2) is more preferably at most 7 times the amount of silica (1), and still more preferably at most 4 times the amount of silica (1).

The amount of silica (1) for each 100 parts by mass of the rubber component is preferably not less than 2 parts by mass, more preferably not less than 5 parts by mass, and still more preferably not less than 10 parts by mass. If the amount of silica (1) is less than 2 parts by mass, fuel economy may not be sufficiently improved. Also, the amount of silica (1) is preferably not more than 70 parts by mass, and more preferably not more than 65 parts by mass. If the amount of silica (1) is more than 70 parts by mass, while good fuel economy is achieved, rubber strength and abrasion resistance tend to decrease.

The amount of silica (2) for each 100 parts by mass of the rubber component is preferably not less than 2 parts by mass, more preferably not less than 5 parts by mass, and still more preferably not less than 10 parts by mass. If the amount of silica (2) is less than 2 parts by mass, sufficient abrasion resistance may not be achieved. Also, the amount of silica (2) is preferably not more than 70 parts by mass, and more preferably not more than 65 parts by mass. If the amount of silica (2) is more than 70 parts by mass, while good abrasion resistance is achieved, processability tends to deteriorate.

The combined amount of silica (1) and silica (2) for each 100 parts by mass of the rubber component is preferably not less than 5 parts by mass, more preferably not less than 10 parts by mass, and still more preferably not less than 20 parts by mass. If the combined amount is less than 5 parts by mass, the effect of the silica (1) and silica (2) added tends not to be sufficiently achieved, and thus abrasion resistance tends to decrease. Also, the combined amount of silica (1) and silica (2) is preferably not more than 100 parts by mass, and more preferably not more than 70 parts by mass. If the combined amount exceeds 100 parts by mass, processability and fuel economy tend to deteriorate.

The rubber composition of the present invention includes a silane coupling agent. From the viewpoint of achieving a balanced improvement in fuel economy, abrasion resistance, and processability, the amount of the silane coupling agent is 2 to 12 parts by mass, preferably 5 to 12 parts by mass, for each 100 parts by mass of silica.

The silane coupling agent is preferably a compound containing a mercapto group (mercapto group-containing silane coupling agent) because its combined use with the conjugated diene polymer and silica can synergistically improve the properties. When a mercapto group-containing silane coupling agent is used together with the silica (1) and the silica (2) or a specific liquid resin mentioned later, the effects of improving the properties can further be enhanced.

The mercapto group-containing silane coupling agent may suitably be a compound represented by the formula (1) below, and/or a compound containing a linking unit A represented by the formula (2) below and a linking unit B represented by the formula (3) below,

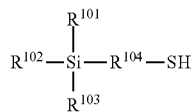

wherein $R^{101}$ to $R^{103}$ each represent a branched or unbranched $C_{1-12}$ alkyl group, a branched or unbranched $C_{1-12}$ alkoxy group, or a group represented by $-O-(R^{111}-O)_z-R^{112}$ where z $R^{111}$s each represent a branched or unbranched $C_{1-30}$ divalent hydrocarbon group, and z $R^{111}$s may be the same as or different from one another; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and z represents an integer of 1 to 30, and $R^{101}$ to $R^{103}$ may be the same as or different from one another; and $R^{104}$ represents a branched or unbranched $C_{1-6}$ alkylene group;

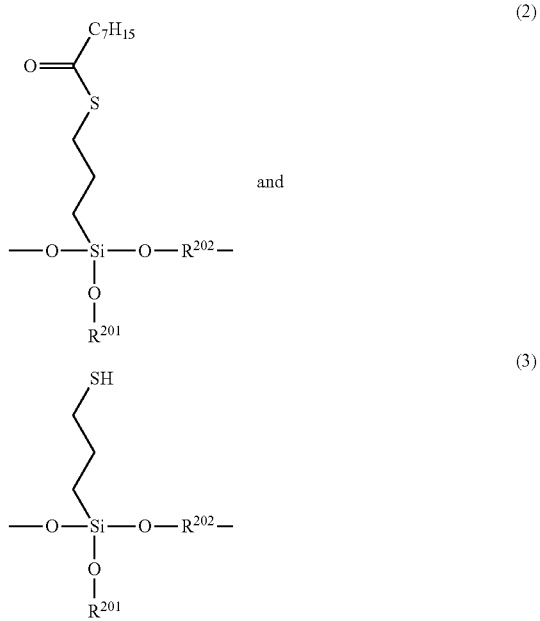

wherein $R^{201}$ represents a hydrogen atom, a halogen atom, a branched or unbranched $C_{1-30}$ alkyl group, a branched or unbranched $C_{2-30}$ alkenyl group, a branched or unbranched $C_{2-30}$ alkynyl group, or the alkyl group in which a terminal hydrogen atom is replaced with a hydroxy group or a carboxyl group; $R^{202}$ represents a branched or unbranched $C_{1-30}$ alkylene group, a branched or unbranched $C_{2-30}$ alkenylene group, or a branched or unbranched $C_{2-30}$ alkynylene group; and $R^{201}$ and $R^{202}$ may be joined together to form a cyclic structure.

The following describes the compound represented by the formula (I).

The use of the compound represented by the formula (1) allows the silica to disperse well, and thus the effects of the present invention can be well achieved. In particular, the use of this compound can more greatly improve fuel economy.

$R^{101}$ to $R^{103}$ each represent a branched or unbranched $C_{1-12}$ alkyl group, a branched or unbranched $C_{1-12}$ alkoxy group, or a group represented by $-O-(R^{111}-O)_z-R^{112}$. In terms of achieving the effects of the present invention well, preferably at least one of $R^{101}$ to $R^{203}$ is a group represented by $-O-(R^{111}-O)_z-R^{112}$, and more preferably two of $R^{101}$ to $R^{103}$ are groups represented by $-O-(R^{111}-O)_z-R^{112}$ while the other is a branched or unbranched $C_{1-12}$ alkoxy group.

Examples of the branched or unbranched $C_{1-12}$ (preferably $C_{1-5}$) alkyl groups for $R^{101}$ to $R^{103}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, and a nonyl group.

Examples of the branched or unbranched $C_{1-12}$ (preferably $C_{1-5}$) alkoxy groups for $R^{101}$ to $R^{103}$ include a methoxy group, an ethoxy group, an n-propoxy group, an isopropoxy group, an n-butoxy group, an iso-butoxy group, a sec-butoxy group, a tert-butoxy group, a pentyloxy group, a hexyloxy group, a heptyloxy group, a 2-ethylhexyloxy group, an octyloxy group, and a nonyloxy group.

$R^{111}$ in the group represented by $-O-(R^{111}-O)_z-R^{112}$ for $R^{101}$ to $R^{103}$ represents a branched or unbranched $C_{1-30}$ (preferably $C_{1-15}$, more preferably $C_{1-3}$) divalent hydrocarbon group.

Examples of the hydrocarbon groups include branched or unbranched $C_{1-30}$ alkylene groups, branched or unbranched $C_{2-30}$ alkenylene groups, branched or unbranched $C_{2-30}$ alkynylene groups, and $C_{6-30}$ arylene groups. Branched or unbranched $C_{1-30}$ alkylene groups are preferred among the examples.

Examples of the branched or unbranched $C_{1-30}$ (preferably $C_{1-15}$, more preferably $C_{1-3}$) alkylene groups for $R^{111}$ include a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group.

Examples of the branched or unbranched $C_{2-30}$ (preferably $C_{2-15}$, more preferably $C_{2-3}$) alkenylene groups for $R^{111}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group.

Examples of the branched or unbranched $C_{2-30}$ (preferably $C_{2-15}$, more preferably $C_{2-3}$) alkynylene groups for $R^{111}$ include an ethynylene group, a propynylene group, a butynylene group, a pentynylene group, a hexynylene group, a heptynylene group, an octynylene group, a nonynylene group, a decynylene group, an undecynylene group, and a dodecynylene group.

Examples of the $C_{6-30}$ (preferably $C_{6-15}$) arylene groups for $R^{111}$ include a phenylene group, a tolylene group, a xylylene group, and a naphthylene group.

Here, z represents an integer of 1 to 30 (preferably 2 to 20, more preferably 3 to 7, and still more preferably 5 or 6).

$R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group. $R^{112}$ is especially preferably a branched or unbranched $C_{1-30}$ alkyl group.

Examples of the branched or unbranched $C_{1-30}$ (preferably $C_{3-25}$, more preferably $C_{10-15}$) alkyl groups for $R^{112}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, and an octadecyl group.

Examples of the branched or unbranched $C_{2-30}$ (preferably $C_{3-25}$, more preferably $C_{10-15}$) alkenyl groups for $R^{112}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, a 1-octenyl group, a decenyl group, an undecenyl group, a dodecenyl group, a tridecenyl group, a tetradecenyl group, a pentadecenyl group, and an octadecenyl group.

Examples of the $C_{6-30}$ (preferably $C_{10-20}$) aryl groups for $R^{112}$ include a phenyl group, a tolyl group, a xylyl group, a naphthyl group, and a biphenyl group.

Examples of the $C_{7-30}$ (preferably $C_{10-20}$) aralkyl groups for $R^{112}$ include a benzyl group and a phenethyl group.

Specific examples of the group represented by —O—$(R^{111}$—O$)_z$—$R^{112}$ include groups represented by —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$ and —O—$(C_2H_4$—O$)_7$—$C_{13}H_{27}$. Preferred among the examples are groups represented by —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{311}$ and —O—$(C_2H_4$—O$)_6$—$C_{13}H_{27}$.

Examples of the branched or unbranched $C_{1-6}$ (preferably $C_{1-5}$) alkylene groups for $R^{104}$ include groups as mentioned for the branched or unbranched $C_{1-30}$ alkylene group for $R^{111}$.

Examples of the compounds represented by the formula (1) include 3-mercaptopropyltrimethoxysilane, 3-mercaptopropyltriethoxysilane, 2-mercaptoethyltrimethoxysilane, 2-mercaptoethyltriethoxysilane, and a compound represented by the following formula (Si363 produced by Evonik Degussa). The compound represented by the following formula may be suitably used. These compounds may be used alone or two or more of these may be used in combination.

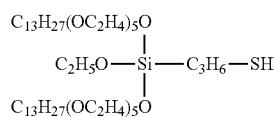

The following describes the compound containing a linking unit A represented by the formula (2) and a linking unit B represented by the formula (3).

In the case where the compound containing a linking unit A represented by the formula (2) and a linking unit B represented by the formula (3) is used, the increase in viscosity during the processing is suppressed as compared to the case where polysulfide silane such as bis-(3-triethoxysilylpropyl) tetrasulfide is used. This is presumably because, since the sulfide moiety of the linking unit A is a C—S—C bond, the compound is thermally more stable than tetrasulfide or disulfide, and thus Mooney viscosity is less likely to greatly increase.

Further, the decrease in scorch time is suppressed as compared to the case where mercapto silane such as 3-mercaptopropyltrimethoxysilane is used. This is presumably because, though the linking unit B has a mercaptosilane structure, the —$C_7H_{15}$ moiety of the linking unit A covers the —SH group of the linking unit B, as a result of which the SH group is less likely to react with polymers and therefore scorch is less likely to occur.

From the viewpoint of enhancing the effects of suppressing the increase in viscosity during the processing and of suppressing the decrease in scorch time as mentioned above, the linking unit A content in the silane coupling agent having the aforementioned structure is preferably not less than 30 mol %, and more preferably not less than 50 mol %, whereas it is preferably not more than 99 mol %, and more preferably not more than 90 mol %. Also, the linking unit B content is preferably not less than 1 mol %, more preferably not less than 5 mol %, and still more preferably not less than 10 mol %, whereas it is preferably not more than 70 mol %, more preferably not more than 65 mol %, and still more preferably not more than 55 mol %. Moreover, the combined content of the linking unit A and the linking unit B is preferably not less than 95 mol %, more preferably not less than 98 mol %, and particularly preferably 100 mol %.

The linking unit A or B content refers to the amount including the linking unit A or B that is present at the terminals of the silane coupling agent, if any. In the case where the linking unit A or B is present at the terminal of the silane coupling agent, its form is not particularly limited as long as it forms a unit corresponding to the formula (2) representing the linking unit A or the formula (3) representing the linking unit B.

Examples of the halogen atoms for $R^{201}$ include chlorine, bromine, and fluorine.

Examples of the branched or unbranched $C_{1-30}$ alkyl groups for $R^{201}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The alkyl group preferably has 1 to 12 carbon atom(s).

Examples of the branched or unbranched $C_{2-30}$ alkenyl groups for $R^{201}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The alkenyl group preferably has 2 to 12 carbon atoms.

Examples of the branched or unbranched $C_{2-30}$ alkynyl groups for $R^{201}$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The alkynyl group preferably has 2 to 12 carbon atoms.

Examples of the branched or unbranched $C_{1-30}$ alkylene groups for $R^{202}$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The alkylene group preferably has 1 to 12 carbon atom(s).

Examples of the branched or unbranched $C_{2-30}$ alkenylene groups for $R^{202}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The alkenylene group preferably has 2 to 12 carbon atoms.

Examples of the branched or unbranched $C_{2-30}$ alkynylene groups for $R^{202}$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The alkynylene group preferably has 2 to 12 carbon atoms.

In the compound containing the linking unit A represented by the formula (2) and the linking unit B represented by the formula (3), the total number of repetitions (x+y) of the number of repetitions (x) of the linking unit A and the number of repetitions (y) of the linking unit B is preferably in the range of 3 to 300. When the total number of repetitions falls within the range mentioned above, the —$C_7H_{15}$ moiety of the linking unit A covers the mercaptosilane of the linking unit B, which makes it possible not only to suppress the decrease in scorch time, but also to ensure good reactivity to silica and the rubber component.

Examples of the compounds containing the linking unit A represented by the formula (2) and the linking unit B represented by the formula (3) include NXT-Z30, NXT-Z45, and NXT-Z60 (produced by Momentive Performance Materials). These may be used alone, or two or more of these may be used in combination.

The amount of the mercapto group-containing silane coupling agent for each 100 parts by mass of silica is preferably not less than 2 parts by mass, more preferably not less than 6 parts by mass, and still more preferably not less than 10 parts by mass. If the amount is less than 2 parts by mass, fuel economy may not be sufficiently improved. Also, the amount of the mercapto group-containing silane coupling agent is preferably not more than 12 parts by mass, and more preferably not more than 10 parts by mass. If the amount exceeds 12 parts by mass, an improving effect commensurate with the increase in cost tends not to be achieved.

The rubber composition of the present invention may include other silane coupling agents together with the mercapto group-containing silane coupling agent. Examples of other silane coupling agents include bis(3-triethoxysilylpropyl)tetrasulfide, bis(3-trimethoxysilylpropyl)tetrasulfide, and bis(2-triethoxysilylpropyl)tetrasulfide. These may be used alone or in any combinations of two or more. Preferred among these is bis(3-triethoxysilylpropyl)tetrasulfide as it is more effective in enhancing reinforcement and processability.

From the viewpoint of ensuring good processability, the amount of other silane coupling agents for each 100 parts by mass of silica is preferably not less than 0.5 parts by mass, and more preferably not less than 3 parts by mass, whereas it is preferably not more than 10 parts by mass. Also from the same viewpoint, the amount of other silane coupling agents is preferably less than the amount of the mercapto group-containing silane coupling agent.

The rubber composition of the present invention preferably includes a liquid resin having a softening point of −20 to 20° C. When the liquid resin is used together with the conjugated diene polymer, the effects of improving the properties can be synergistically enhanced. Further, when the liquid resin is used together with the mercapto group-containing silane coupling agent, or the silica (1) and the silica (2), the effects of improving the properties can further be enhanced.

The liquid resin has a lower softening point than solid resins, and is in a liquid form at 70° C., at which there is considered to be a correlation with rolling resistance properties. Thus, it is considered that the use of the liquid resin allows polymers to easily move, which reduces energy loss so that fuel economy can be improved.

Examples of the liquid resins include liquid petroleum or coal resins such as liquid coumarone-indene resin, liquid indene resin, liquid α-methylstyrene resin, liquid vinyltoluene resin, and liquid polyisopentane resin. Liquid coumarone-indene resin is preferred among these as it is more effective in improving fuel economy.

The liquid resin has a softening point of not lower than −20° C., preferably not lower than −5° C., and more preferably not lower than 0° C. A liquid resin having a softening point lower than −20° C. tends to have too low a viscosity and thus to be poorly mixed with the rubber component. Also, the liquid resin has a softening point of not higher than 20° C., preferably not higher than 19° C., and more preferably not higher than 17° C. A liquid resin having a softening point higher than 20° C. tends to increase energy loss so that fuel economy can be deteriorated.

Herein, the softening point is measured as set forth in JIS K 6220-1:2001 with a ring and ball softening point apparatus. The temperature at which the ball drops down is determined as the softening point.

The amount of the liquid resin for each 100 parts by mass of the rubber component is preferably not less than 1 part by mass, and more preferably not less than 2 parts by mass. If the amount is less than 1 part by mass, fuel economy may not be sufficiently improved. Also, the amount of the liquid resin is preferably not more than 10 parts by mass, and more preferably not more than 8 parts by mass. If the amount is more than 10 parts by mass, while good processability (particularly during the extrusion step) can be achieved, fuel economy tends to deteriorate.

The liquid resin may be at least one resin having a glass transition temperature of −40 to 20° C. selected from the group consisting of aromatic petroleum resins, terpene resins, and rosin resins, or a plasticizer having a glass transition temperature of −40 to 20° C.

The Tg (midpoint glass transition temperature) values of the resin and the plasticizer are measured at a rate of temperature rise of 10° C./min. with a differential scanning calorimeter Q200 (produced by TA Instruments Japan Inc.) in accordance with JIS-K7121.

Known additives may be used, and examples thereof include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; fillers such as carbon black, calcium carbonate, talc, alumina, clay, aluminum hydroxide, and mica; processing aids such as extender oils and lubricants; and antioxidants.

Examples of the carbon black include furnace black (furnace carbon black) such as SAF, ISAF, HAF, MAF, FEF, SRF, GPF, APF, FF, CF, SCF or ECF; acetylene black (acetylene carbon black); thermal black (thermal carbon black) such as FT or MT; channel black (channel carbon black) such as EPC, MPC or CC; and graphite. These may be used alone or two or more of these may be used in combination.

The amount of carbon black for each 100 parts by mass of the rubber component is preferably not less than 1 part by mass, more preferably not less than 3 parts by mass, and still more preferably not less than 20 parts by mass. If the amount is less than 1 part by mass, sufficient reinforcement may not be achieved. The amount of carbon black is preferably not more than 90 parts by mass, and more preferably not more than 85 parts by mass. If the amount is more than 90 parts by mass, fuel economy tends to deteriorate.

The nitrogen adsorption specific surface area ($N_2SA$) of carbon black is usually 5 to 200 $m^2/g$, and preferably the lower limit and the upper limit thereof are 50 $m^2/g$ and 150 $m^2/g$, respectively. The dibutyl phthalate (DBP) absorption of carbon black is usually 5 to 300 mL/100 g, and preferably the lower limit and the upper limit thereof are 80 mL/100 g and 180 mL/100 g, respectively. If the $N_2SA$ or DBP absorption of carbon black is lower than the lower limit of the range mentioned above, the reinforcement effect tends to be small and thus abrasion resistance tends to decrease. If the $N_2SA$ or DBP absorption of carbon black is larger than the upper limit of the range mentioned above, the carbon black tends to poorly disperse and thus hysteresis loss tends to increase so that fuel economy can be reduced. The nitrogen adsorption specific surface area is measured in accordance with ASTM D4820-93. The DBP absorption is measured in accordance with ASTM D2414-93. Examples of commercially available carbon blacks include SEAST 6, SEAST 7HM, and SEAST KH (trade name, produced by Tokai Carbon Co., Ltd.), and CK 3 and Special Black 4A (trade name, produced by Evonik Degussa).

Examples of the extender oils include aromatic mineral oils (viscosity gravity constant (V.G.C. value): 0.900 to 1.049), naphthenic mineral oils (V.G.C. value: 0.850 to 0.899), and paraffinic mineral oils (V.G.C. value: 0.790 to 0.849). The polycyclic aromatics content in the extender oil is preferably less than 3% by mass, and more preferably less than 1% by mass. The polycyclic aromatics content is measured according to the British Institute of Petroleum 346/92 method. The aromatic compound content (CA) in the extender oil is preferably not less than 20% by mass. Two or more kinds of these extender oils may be used in combination.

Examples of the vulcanization accelerators include: thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. The amount thereof is preferably 0.1 to 5 parts by mass, and more preferably 0.2 to 3 parts by mass, for each 100 parts by mass of the rubber component.

The rubber composition may be prepared from the conjugated diene polymer combined with other rubber materials, additives and the like according to a known method, for example, by kneading components with a known mixer such as a roll mill or a Banbury mixer.

With regard to the kneading conditions when additives other than vulcanizing agents and vulcanization accelerators are mixed, the kneading temperature is usually 50 to 200° C., preferably 80 to 190° C., and the kneading time is usually 30 seconds to 30 minutes, preferably 1 minute to 30 minutes.

When a vulcanizing agent and a vulcanization accelerator are mixed, the kneading temperature is usually not higher than 100° C., and preferably ranges from room temperature to 80° C. The composition containing a vulcanizing agent and a vulcanization accelerator is usually used after it is vulcanized by press vulcanization or the like. The vulcanization temperature is usually 120 to 200° C., preferably 140 to 180° C.

The use of the rubber composition of the present invention enables to provide a pneumatic tire which has balanced fuel economy and abrasion resistance at high levels while maintaining good processability (particularly during the extrusion step).

The rubber composition of the present invention can be used for various components of a tire, and suitably used in a clinch apex.

The pneumatic tire of the present invention can be prepared from the rubber composition by a conventional method. Specifically, the unvulcanized rubber composition optionally containing various additives is extruded and processed into the shape of a tire component (e.g. clinch apex), and then formed in a conventional manner on a tire building machine and assembled with other tire components to provide an unvulcanized tire. Then, the unvulcanized tire is heated and pressed in a vulcanizer, whereby the pneumatic tire of the present invention can be prepared.

The pneumatic tire of the present invention can be suitably used as a tire for passenger vehicles.

Examples

The present invention is more specifically described with reference to examples. However, the present invention is not limited thereto.

The following is a list of the chemical agents used in the synthesis or polymerization. The chemical agents were purified, if needed, by usual methods.

THF: anhydrous tetrahydrofuran, produced by Kanto Chemical Co., Inc.
Sodium hydride: produced by Kanto Chemical Co., Inc.
Diethylamine: produced by Kanto Chemical Co., Inc.
Methylvinyldichlorosilane: produced by Shin-Etsu Chemical Co., Ltd.
Anhydrous hexane: produced by Kanto Chemical Co., Inc.
Styrene: produced by Kanto Chemical Co., Inc.
Butadiene: 1,3-butadiene, produced by Tokyo Chemical Industry Co., Ltd.
TMEDA: tetramethylethylenediamine, produced by Kanto Chemical Co., Inc.
n-Butyllithium solution: 1.6 M n-butyllithium in hexane, produced by Kanto Chemical Co., Inc.
Initiator (1): AI-200CE2 (compound formed by bonding 3-(N,N-dimethylamino)-1-propyllithium and two isoprene-derived structural units, represented by the following formula) (0.9 M), produced by FMC

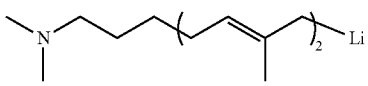

Piperidine: produced by Tokyo Chemical Industry Co., Ltd.
Diamylamine: produced by Tokyo Chemical Industry Co., Ltd.
2,6-Di-tert-butyl-p-cresol: Nocrac 200, produced by Ouchi Shinko Chemical Industrial Co., Ltd.
Bis(dimethylamino)methylvinylsilane: produced by Shin-Etsu Chemical Co., Ltd.
N,N-dimethylaminopropylacrylamide: produced by Tokyo Chemical Industry Co., Ltd.
3-Diethylaminopropyltriethoxysilane: produced by Azmax Co 1,3-Dimethyl-2-imidazolidinone: produced by Tokyo Chemical Industry Co., Ltd.
Tris[3-(trimethoxysilyl)propyl]isocyanurate: produced by Shin-Etsu Chemical Co., Ltd.
N,N-dimethylformamide dimethyl acetal: produced by Tokyo Chemical Industry Co., Ltd.
1,3-Diisopropenylbenzene: produced by Tokyo Chemical Industry Co., Ltd.
sec-Butyllithium solution: produced by Kanto Chemical Co., Inc. (1.0 mol/L)
Cyclohexane: produced by Kanto Chemical Co., Inc.
<Preparation of Modifier (1) (Terminal Modifier)>

In a nitrogen atmosphere, 15.6 g of N-(3-dimethylaminopropyl)acrylamide was charged into a 100-mL volumetric flask, and anhydrous hexane was also added to increase the total amount to 100 mL. In this manner, a modifier (1) was prepared.
<Preparation of Modifier (2) (Main Chain Modifier)>

THF (1000 mL) and sodium hydride (13 g) were charged into a sufficiently nitrogen-purged 2-L three-necked flask, and diethylamine (36.5 g) was slowly added dropwise thereto on an ice water bath while stirring. After stirring for 30 minutes, methylvinyldichlorosilane (36 g) was added dropwise over 30 minutes, followed by stirring for 2 hours. The resulting solution was concentrated, filtered, and purified by distillation under reduced pressure to synthesize bis(diethylamino)methylvinylsilane. The bis(diethylamino)methylvinylsilane (21.4 g) was charged into a 100-mL volumetric flask in a nitrogen atmosphere, and anhydrous hexane was also added to increase the total amount to 100 mL.

<Preparation of Modifier (3) (Terminal Modifier)>
In a nitrogen atmosphere, 3-diethylaminopropyltriethoxysilane (27.7 g) was charged into a 100-mL volumetric flask, and anhydrous hexane was also added to increase the total amount to 100 mL. In this manner, a modifier (3) was prepared.
<Preparation of Modifier (4) (Terminal Modifier)>
In a nitrogen atmosphere, 1,3-dimethyl-2-imidazolidinone (11.4 g) was charged into a 100-mL volumetric flask, and anhydrous hexane was also added to increase the total amount to 100 mL. In this manner, a modifier (4) was prepared.
<Preparation of Modifier (5) (Terminal Modifier)>
In a nitrogen atmosphere, tris[3-(trimethoxysilyl)propyl] isocyanurate (30.7 g) was charged into a 100-mL volumetric flask, and anhydrous hexane was also added to increase the total amount to 200 mL. In this manner, a modifier (5) was prepared.
<Preparation of Modifier (6) (Terminal Modifier)>
In a nitrogen atmosphere, N,N-dimethylformamide dimethyl acetal (11.9 g) was charged into a 100-mL volumetric flask, and anhydrous hexane was also added to increase the total amount to 200 mL. In this manner, a modifier (6) was prepared.
<Copolymer Analysis>

Copolymers (conjugated diene polymers) obtained as mentioned later were analyzed by the following methods.
<Measurement of Weight-Average Molecular Weight (Mw) and Number-Average Molecular Weight (Mn)>

The weight-average molecular weight (Mw) and number-average molecular weight (Mn) of each copolymer were measured using gel permeation chromatography (GPC) (GPC-8000 series produced by Tosoh Corporation, detector: differential refractometer, column: TSKGEL SUPERMULTIPORE HZ-M produced by Tosoh Corporation), and expressed relative to polystyrene standards. A molecular weight distribution Mw/Mn was calculated from the measurement results.
<Structural Identification of Copolymers>

The structures (styrene content, vinyl content) of copolymers were identified with a device of JNM-ECA series produced by JEOL Ltd. Each polymer (0.1 g) was dissolved in toluene (15 mL), and the solution was slowly poured in methanol (30 mL) for reprecipitation. The resulting precipitate was dried under reduced pressure and then measured.
<Synthesis of Copolymer (1)> n-Hexane (18 L), styrene (600 g), butadiene (1400 g), the modifier (2) (40 mL), and TMEDA (10 mmol) were charged into a sufficiently nitrogen-purged 30-L pressure resistant container, and heated to 40° C. After further addition of the initiator (1) (19 mL), the mixture was heated to 50° C., and stirred for 3 hours. Next, the modifier (1) (20 mL) was added, followed by stirring for 30 minutes. The reaction solution was mixed with methanol (15 mL) and 2,6-tert-butyl-p-cresol (0.1 g). Then, a coagulum was recovered from the polymer solution by steam stripping treatment, and the coagulum was dried under reduced pressure for 24 hours to give a copolymer (1). Here, 0.43 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (1)) containing a nitrogen atom and/or a silicon atom was introduced per mol of the alkali metal derived from the polymerization initiator introduced.
<Synthesis of Copolymer (2)>

A copolymer (2) was prepared based on the same formulation as that for the synthesis of the copolymer (1), except that an n-butyllithium solution (10.6 mL) was used instead of the initiator (1) (19 mL). Here, 0.43 g of the silicon-containing vinyl compound (modifier (2)) was introduced for each 100 g of the monomer component; and 1.18 mol of the compound (modifier (1)) containing a nitrogen atom and/or a silicon atom was introduced per mol of the alkali metal derived from the polymerization initiator introduced.

<Synthesis of Copolymer (3)> n-Hexane (18 L), styrene (600 g), butadiene (1400 g), and TMEDA (10 mmol) were charged into a sufficiently nitrogen-purged 30-L pressure resistant container, and heated to 40° C. After further addition of an n-butyllithium solution (11 mL), the mixture was heated to 50° C. and stirred for 3 hours. Next, the reaction solution was mixed with methanol (1 mL) and 2,6-tert-butyl-p-cresol (0.1 g). Then, a coagulum was recovered from the polymer solution by steam stripping treatment, and the coagulum was dried under reduced pressure for 24 hours to give a copolymer (3).

<Synthesis of Copolymer (4)>

A copolymer (4) was prepared based on the same formulation as that for the synthesis of the copolymer (1), except that a coagulum was recovered from the polymer solution by, instead of steam stripping treatment, evaporating the polymer solution at room temperature for 24 hours, followed by drying under reduced pressure. Here, 0.43 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (1)) containing a nitrogen atom and/or a silicon atom was introduced per mol of the alkali metal derived from the polymerization initiator introduced.

<Synthesis of Copolymer (5)>

A copolymer (5) was prepared based on the same formulation as that for the synthesis of the copolymer (1), except that the amounts of the modifier (2) (40 mL) and the modifier (1) (20 mL) were both changed to 0 mL. Here, 8.5 mmol of the polymerization initiator (initiator (1)) was introduced for each 100 g of the monomer component.

<Synthesis of Copolymer (6)>

A copolymer (6) was prepared based on the same formulation as that for the synthesis of the copolymer (1), except that an n-butyllithium solution (6.8 mL) was used instead of the initiator (1) (19 mL), and the amount of the modifier (1) was changed from 20 mL to 0 mL. Here, 0.43 g of the silicon-containing vinyl compound (modifier (2)) was introduced for each 100 g of the monomer component.

<Synthesis of Copolymer (7)>

A copolymer (7) was prepared based on the same formulation as that for the synthesis of the copolymer (1), except that the modifier (3) (20 mL) was used instead of the modifier (1) (20 mL). Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (3)) containing a nitrogen atom and/or a silicon atom was introduced per mol of the alkali metal derived from the polymerization initiator introduced.

<Synthesis of Copolymer (8)>

A copolymer (8) was prepared based on the same formulation as that for the synthesis of the copolymer (7), except that a coagulum was recovered from the polymer solution by, instead of steam stripping treatment, evaporating the polymer solution at room temperature for 24 hours, followed by drying under reduced pressure. Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (3)) containing a nitrogen atom and/or a silicon atom was introduced per mol of the alkali metal derived from the polymerization initiator introduced.

<Synthesis of Copolymer (9)>

A copolymer (9) was prepared based on the same formulation as that for the synthesis of the copolymer (7), except that an n-butyllithium solution (10.6 mL) was used instead of the initiator (1) (19 mL), and the amount of the modifier (2) was changed from 40 mL to 0 mL. Here, 1.18 mol of the compound (modifier (3)) containing a nitrogen atom and/or a silicon atom was introduced per mol of the alkali metal derived from the polymerization initiator introduced.

<Synthesis of Copolymer (10)>

A copolymer (10) was prepared based on the same formulation as that for the synthesis of the copolymer (1), except that the amounts of styrene and butadiene were changed to 0 g and 2000 g, respectively; THF (5 mmol) was used instead of TMEDA (10 mmol); and the amount of the initiator (1) was changed from 19 mL to 23 mL. Here, 0.43 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (1)) containing a nitrogen atom and/or a silicon atom was introduced per mol of the alkali metal derived from the polymerization initiator introduced.

<Synthesis of Copolymer (11)>

A copolymer (11) was prepared based on the same formulation as that for the synthesis of the copolymer (10), except that a coagulum was recovered from the polymer solution by, instead of steam stripping treatment, evaporating the polymer solution at room temperature for 24 hours, followed by drying under reduced pressure. Here, 0.43 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (1)) containing a nitrogen atom and/or a silicon atom was introduced per mol of the alkali metal derived from the polymerization initiator introduced.

<Synthesis of Copolymer (12)>

A copolymer (12) was prepared based on the same formulation as that for the synthesis of the copolymer (1), except that the modifier (4) (20 mL) was used instead of the modifier (1) (20 mL). Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (13)>

A copolymer (13) was prepared based on the same formulation as that for the synthesis of the copolymer (12), except that a coagulum was recovered from the polymer solution by, instead of steam stripping treatment, evaporating the polymer solution at room temperature for 24 hours, followed by drying under reduced pressure. Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (14)>

A copolymer (14) was prepared based on the same formulation as that for the synthesis of the copolymer (12), except that an n-butyllithium solution (10.6 mL) was used instead of the initiator (1) (19 mL), and the amount of the modifier (2) was changed from 40 mL to 0 mL. Here, 1.18 mol of the compound (modifier (4)) containing a nitrogen atom and/or a silicon atom was introduced per mol of the alkali metal derived from the polymerization initiator introduced.

<Synthesis of Copolymer (15)>

A copolymer (15) was prepared based on the same formulation as that for the synthesis of the copolymer (1), except that the modifier (5) (20 mL) was used instead of the modifier (1) (20 mL). Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (16)>

A copolymer (16) was prepared based on the same formulation as that for the synthesis of the copolymer (15), except that a coagulum was recovered from the polymer solution by, instead of steam stripping treatment, evaporating the polymer solution at room temperature for 24 hours, followed by drying under reduced pressure. Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (17)>

A copolymer (17) was prepared based on the same formulation as that for the synthesis of the copolymer (15), except that an n-butyllithium solution (10.6 mL) was used instead of the initiator (1) (19 mL), and the amount of the modifier (2) was changed from 40 mL to 0 mL. Here, 1.18 mol of the compound (modifier (5)) containing a nitrogen atom and/or a silicon atom was introduced per mol of the alkali metal derived from the polymerization initiator introduced.

<Synthesis of Copolymer (18)>

A copolymer (18) was prepared based on the same formulation as that for the synthesis of the copolymer (1), except that the modifier (6) (20 mL) was used instead of the modifier (1) (20 mL). Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (6)) containing a nitrogen atom and/or a silicon atom was introduced per mol of the alkali metal derived from the polymerization initiator introduced.

<Synthesis of Copolymer (19)>

A copolymer (19) was prepared based on the same formulation as that for the synthesis of the copolymer (18), except that a coagulum was recovered from the polymer solution by, instead of steam stripping treatment, evaporating the polymer solution at room temperature for 24 hours, followed by drying under reduced pressure. Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (6)) containing a nitrogen atom and/or a silicon atom was introduced per mol of the alkali metal derived from the polymerization initiator introduced.

<Synthesis of Copolymer (20)>

A copolymer (20) was prepared based on the same formulation as that for the synthesis of the copolymer (18), except that an n-butyllithium solution (10.6 mL) was used instead of the initiator (1) (19 mL), and the amount of the modifier (2) was changed from 40 mL to 0 mL. Here, 1.18 mol of the compound (modifier (6)) containing a nitrogen atom and/or a silicon atom was introduced per mol of the alkali metal derived from the polymerization initiator introduced.

Table 1 summarizes the monomer components and others of the copolymers (1) to (20).

TABLE 1

| Copolymer | Initiator | Monomer component | Terminal modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (1) | Initiator (1) | Styrene, 1,3-Butadiene, Modifier (2) | Modifier (1) | 30 | 56 | 1.18 | 26.0 |
| Copolymer (2) | n-Butyllithium solution | Styrene, 1,3-Butadiene, Modifier (2) | Modifier (1) | 30 | 55 | 1.17 | 24.5 |
| Copolymer (3) | n-Butyllithium solution | Styrene, 1,3-Butadiene | Not added | 30 | 56 | 1.09 | 26.5 |
| Copolymer (4) | Initiator (1) | Styrene, 1,3-Butadiene, Modifier (2) | Modifier (1) | 30 | 57 | 1.19 | 25.2 |
| Copolymer (5) | Initiator (1) | Styrene, 1,3-Butadiene | Not added | 30 | 57 | 1.16 | 26.1 |
| Copolymer (6) | n-Butyllithium solution | Styrene, 1,3-Butadiene, Modifier (2) | Not added | 30 | 56 | 1.13 | 27.9 |
| Copolymer (7) | Initiator (1) | Styrene, 1,3-Butadiene, Modifier (2) | Modifier (3) | 30 | 56 | 1.20 | 25.8 |
| Copolymer (8) | Initiator (1) | Styrene, 1,3-Butadiene, Modifier (2) | Modifier (3) | 30 | 58 | 1.18 | 26.2 |
| Copolymer (9) | n-Butyllithium solution | Styrene, 1,3-Butadiene | Modifier (3) | 30 | 56 | 1.14 | 27.1 |
| Copolymer (10) | Initiator (1) | 1,3-Butadiene, Modifier (2) | Modifier (1) | 0 | 14.2 | 1.19 | 26.2 |
| Copolymer (11) | Initiator (1) | 1,3-Butadiene, Modifier (2) | Modifier (1) | 0 | 14 | 1.21 | 26.3 |
| Copolymer (12) | Initiator (1) | Styrene, 1,3-Butadiene, Modifier (2) | Modifier (4) | 30 | 56 | 1.13 | 25.6 |
| Copolymer (13) | Initiator (1) | Styrene, 1,3-Butadiene, Modifier (2) | Modifier (4) | 30 | 56 | 1.10 | 25.5 |
| Copolymer (14) | n-Butyllithium solution | Styrene, 1,3-Butadiene | Modifier (4) | 30 | 55 | 1.09 | 26.3 |
| Copolymer (15) | Initiator (1) | Styrene, 1,3-Butadiene, Modifier (2) | Modifier (5) | 30 | 56 | 1.22 | 28.3 |
| Copolymer (16) | Initiator (1) | Styrene, 1,3-Butadiene, Modifier (2) | Modifier (5) | 30 | 57 | 1.18 | 28.0 |

TABLE 1-continued

| Copolymer | Initiator | Monomer component | Terminal modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (17) | n-Butyllithium solution | Styrene, 1,3-Butadiene | Modifier (5) | 30 | 56 | 1.16 | 27.3 |
| Copolymer (18) | Initiator (1) | Styrene, 1,3-Butadiene, Modifier (2) | Modifier (6) | 30 | 57 | 1.18 | 26.8 |
| Copolymer (19) | Initiator (1) | Styrene, 1,3-Butadiene, Modifier (2) | Modifier (6) | 30 | 56 | 1.20 | 28.1 |
| Copolymer (20) | n-Butyllithium solution | Styrene, 1,3-Butadiene | Modifier (6) | 30 | 57 | 1.17 | 27.1 |

The following describes the chemicals used in the examples and comparative examples.
Natural Rubber: RSS#3
Polybutadiene rubber: BR150B produced by Ube Industries, Ltd.
Copolymers (1) to (20): synthesized as above
Silica 1: ULTRASIL 360 ($N_2SA$: 50 $m^2/g$) produced by Evonik Degussa
Silica 2: ZEOSIL 1205 MP ($N_2SA$: 200 $m^2/g$) produced by Rhodia
Silane coupling agent (1): Si69 (bis(3-triethoxysilylpropyl) tetrasulfide) produced by Evonik Degussa
Silane coupling agent (2): NXT-Z45 (a compound containing linking unit A and linking unit B (linking unit A: 55 mol %, linking unit B: 45 mol %)) produced by Momentive Performance Materials
Silane coupling agent (3): Si363 produced by Evonik Degussa Carbon black: ShoBlack N351 ($N_2SA$: 69 $m^2/g$, DBP absorption: 128 mL/100 g) produced by Cabot Japan K.K.
Process oil: Diana Process AH-24 produced by Idemitsu Kosan Co., Ltd.
Liquid resin: NOVARES C10 (liquid coumarone-indene resin, softening point: 5 to 15° C., Tg: −30° C.) produced by Rutgers chemicals
Antioxidant: Antigene 6C produced by Sumitomo Chemical Co., Ltd.
Stearic acid: TSUBAKI stearic acid beads produced by NOF Corporation
Zinc oxide: Zinc oxide produced by Mitsui Mining & Smelting Co., Ltd.
Wax: Sunnoc N produced by Ouchi Shinko Chemical Industrial Co., Ltd.
Sulfur: sulfur powder produced by Karuizawa sulfur
Vulcanization accelerator: NOCCELER CZ produced by Ouchi Shinko Chemical Industrial Co., Ltd.

Examples and Comparative Examples

According to each of the formulations shown in Tables 2 to 14, the materials other than the sulfur and vulcanization accelerator were kneaded for 5 minutes at 150° C. using a 1.7-L Banbury mixer (produced by Kobe Steel, Ltd.) to give a kneadate. The sulfur and vulcanization accelerator were then added to the kneadate, followed by kneading for 5 minutes at 80° C. using an open roll mill to give an unvulcanized rubber composition. The unvulcanized rubber composition was press-vulcanized for 20 minutes at 170° C. in a 0.5 mm-thick mold to obtain a vulcanized rubber composition.

<Evaluation Items and Test Methods>
<Processability Index>

The Mooney viscosity ($ML_{1+4}/130°$ C.) of each unvulcanized rubber composition was determined in accordance with JIS K6300-1:2001 "Rubber, unvulcanized—Physical property—Part 1: Determination of Mooney viscosity and pre-vulcanization characteristics with Mooney viscometer" using a Mooney viscosity tester. That is, under a temperature condition of 130° C. achieved by 1 minute pre-heating, the Mooney viscosity of the unvulcanized rubber composition was measured after a small rotor was rotated for 4 minutes. The result is expressed as an index. A higher index indicates a lower Mooney viscosity, which in turn indicates better processability. The index was calculated according to the following equation.

(Processability index)=(Mooney viscosity of Comparative Example 6)/(Mooney viscosity of each formulation)×100

<Rolling Resistance Index>

The tan δ of each vulcanized rubber composition was measured under a temperature of 70° C., an initial strain of 10%, and a dynamic strain of 2% using a viscoelasticity spectrometer VES (produced by Iwamoto Seisakusho Co., Ltd.). The measured value is expressed as an index relative to that of Comparative Example 1 (=100), using the following equation. A higher index indicates a smaller rolling resistance, which in turn indicates better fuel economy.

(Rolling resistance index)=(tan δ of Comparative Example 6)/(tan δ of each formulation)×100

(Abrasion Resistance Index)

The abrasion loss of each vulcanized rubber composition was measured using a Lambourn abrasion tester at room temperature, a load of 2.0 kgf, and a slip ratio of 35%. The measured value is expressed as an index relative to that of Comparative Example 1 (=100), using the following equation. A higher index indicates higher abrasion resistance.

(Abrasion resistance index)=(Abrasion loss of Comparative Example 6)/(Abrasion loss of each formulation)×100

TABLE 2

| | | Example | | | | | | | | |
|---|---|---|---|---|---|---|---|---|---|---|
| | | 1 | 2 | 3 | 4 | 5 | 6 | 7 | 8 | 9 |
| Formulation (parts by mass) | Natural rubber | 50 | 50 | 50 | 50 | 50 | 50 | 50 | 50 | 50 |
| | Polybutadiene rubber | 15 | 15 | 15 | 15 | 35 | 15 | 15 | 15 | 15 |
| | Copolymer (3) | | | | | | | | | |
| | Copolymer (6) | | | | | | | | | |
| | Copolymer (2) | | | | | | | | | |

TABLE 2-continued

|  |  |  |  |  |  |  |  |  |  |
|---|---|---|---|---|---|---|---|---|---|
| Copolymer (9) |  |  |  |  |  |  |  |  |  |
| Copolymer (5) |  |  |  |  |  |  |  |  |  |
| Copolymer (1) | 35 |  |  |  | 15 | 35 |  |  |  |
| Copolymer (4) |  | 35 |  |  |  |  | 35 |  |  |
| Copolymer (7) |  |  | 35 |  |  |  |  | 35 |  |
| Copolymer (8) |  |  |  | 35 |  |  |  |  | 35 |
| Carbon black | 35 | 35 | 35 | 35 | 35 | 35 | 35 | 35 | 35 |
| Silica (1) | 35 | 35 | 35 | 35 | 35 | 35 | 35 | 35 | 35 |
| Silica (2) |  |  |  |  |  |  |  |  |  |
| Silane coupling agent (1) | 2.8 | 2.8 | 2.8 | 2.8 | 2.8 |  |  |  |  |
| Silane coupling agent (2) |  |  |  |  |  | 2.8 | 2.8 | 2.8 | 2.8 |
| Silane coupling agent (3) |  |  |  |  |  |  |  |  |  |
| Process oil | 10 | 10 | 10 | 10 | 10 | 10 | 10 | 10 | 10 |
| Liquid resin |  |  |  |  |  |  |  |  |  |
| Wax | 2 | 2 | 2 | 2 | 2 | 2 | 2 | 2 | 2 |
| Antioxidant | 2 | 2 | 2 | 2 | 2 | 2 | 2 | 2 | 2 |
| Stearic acid | 2 | 2 | 2 | 2 | 2 | 2 | 2 | 2 | 2 |
| Zinc oxide | 2 | 2 | 2 | 2 | 2 | 2 | 2 | 2 | 2 |
| Sulfur | 2.5 | 2.5 | 2.5 | 2.5 | 2.5 | 2.5 | 2.5 | 2.5 | 2.5 |
| Vulcanization accelerator | 2 | 2 | 2 | 2 | 2 | 2 | 2 | 2 | 2 |
| Processability index (Evaluation) | 108 | 110 | 111 | 109 | 115 | 107 | 109 | 110 | 108 |
| Rolling resistance index | 112 | 107 | 107 | 106 | 108 | 118 | 113 | 113 | 112 |
| Abrasion resistance index | 105 | 104 | 107 | 108 | 101 | 110 | 109 | 112 | 113 |

|  |  | Example |  |  |  |  |  |  |  |  |
|---|---|---|---|---|---|---|---|---|---|---|
|  |  | 10 | 11 | 12 | 13 | 14 | 15 | 16 | 17 | 18 |
| Formulation (parts by mass) | Natural rubber | 50 | 50 | 50 | 50 | 50 | 50 | 50 | 50 | 50 |
|  | Polybutadiene rubber | 35 | 15 | 15 | 15 | 15 | 35 | 15 | 15 | 15 |
|  | Copolymer (3) |  |  |  |  |  |  |  |  |  |
|  | Copolymer (6) |  |  |  |  |  |  |  |  |  |
|  | Copolymer (2) |  |  |  |  |  |  |  |  |  |
|  | Copolymer (9) |  |  |  |  |  |  |  |  |  |
|  | Copolymer (5) |  |  |  |  |  |  |  |  |  |
|  | Copolymer (1) | 15 | 35 |  |  |  | 15 | 35 | 35 | 35 |
|  | Copolymer (4) |  |  | 35 |  |  |  |  |  |  |
|  | Copolymer (7) |  |  |  | 35 |  |  |  |  |  |
|  | Copolymer (8) |  |  |  |  | 35 |  |  |  |  |
|  | Carbon black | 35 | 35 | 35 | 35 | 35 | 35 | 35 | 35 | 35 |
|  | Silica (1) | 35 | 35 | 35 | 35 | 35 | 35 | 25 | 35 | 25 |
|  | Silica (2) |  |  |  |  |  |  | 10 |  | 10 |
|  | Silane coupling agent (1) |  |  |  |  |  |  |  |  |  |
|  | Silane coupling agent (2) | 2.8 |  |  |  |  |  | 2.8 | 2.8 | 2.8 |
|  | Silane coupling agent (3) |  | 2.8 | 2.8 | 2.8 | 2.8 | 2.8 |  |  |  |
|  | Process oil | 10 | 10 | 10 | 10 | 10 | 10 | 10 | 5 | 5 |
|  | Liquid resin |  |  |  |  |  |  |  | 5 | 5 |
|  | Wax | 2 | 2 | 2 | 2 | 2 | 2 | 2 | 2 | 2 |
|  | Antioxidant | 2 | 2 | 2 | 2 | 2 | 2 | 2 | 2 | 2 |
|  | Stearic acid | 2 | 2 | 2 | 2 | 2 | 2 | 2 | 2 | 2 |
|  | Zinc oxide | 2 | 2 | 2 | 2 | 2 | 2 | 2 | 2 | 2 |
|  | Sulfur | 2.5 | 2.5 | 2.5 | 2.5 | 2.5 | 2.5 | 2.5 | 2.5 | 2.5 |
|  | Vulcanization accelerator | 2 | 2 | 2 | 2 | 2 | 2 | 2 | 2 | 2 |
| Evaluation | Processability index | 114 | 102 | 104 | 104 | 103 | 108 | 102 | 104 | 104 |
|  | Rolling resistance index | 114 | 122 | 116 | 116 | 115 | 117 | 104 | 112 | 117 |
|  | Abrasion resistance index | 106 | 112 | 111 | 114 | 115 | 108 | 110 | 114 | 111 |

TABLE 3

|  |  | Comparative Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Formulation (parts by mass) | Natural rubber | 50 | 50 | 50 | 50 | 50 | 50 | 50 | 50 | 50 | 50 |
|  | Polybutadiene rubber | 15 | 15 | 15 | 15 | 15 | 50 | 50 | 15 | 15 |  |
|  | Copolymer (3) | 35 |  |  |  |  |  |  | 35 | 35 |  |
|  | Copolymer (6) |  | 35 |  |  |  |  |  |  |  |  |
|  | Copolymer (2) |  |  | 35 |  |  |  |  |  |  |  |
|  | Copolymer (9) |  |  |  | 35 |  |  |  |  |  |  |
|  | Copolymer (5) |  |  |  |  | 35 |  |  |  |  |  |
|  | Copolymer (1) |  |  |  |  |  |  |  |  |  | 50 |
|  | Copolymer (4) |  |  |  |  |  |  |  |  |  |  |
|  | Copolymer (7) |  |  |  |  |  |  |  |  |  |  |
|  | Copolymer (8) |  |  |  |  |  |  |  |  |  |  |

TABLE 3-continued

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
|  | Carbon black | 35 | 35 | 35 | 35 | 35 | 70 | 35 | 35 | 35 | 35 |
|  | Silica (1) | 35 | 35 | 35 | 35 | 35 |  | 35 | 35 | 35 | 35 |
|  | Silica (2) |  |  |  |  |  |  |  |  |  |  |
|  | Silane coupling agent (1) | 2.8 | 2.8 | 2.8 | 2.8 | 2.8 |  | 2.8 |  |  | 2.8 |
|  | Silane coupling agent (2) |  |  |  |  |  |  |  | 2.8 |  |  |
|  | Silane coupling agent (3) |  |  |  |  |  |  |  |  | 2.8 |  |
|  | Process oil | 10 | 10 | 10 | 10 | 10 | 10 | 10 | 10 | 10 | 10 |
|  | Liquid resin |  |  |  |  |  |  |  |  |  |  |
|  | Wax | 2 | 2 | 2 | 2 | 2 | 2 | 2 | 2 | 2 | 2 |
|  | Antioxidant | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 |
|  | Zinc oxide | 2 | 2 | 2 | 2 | 2 | 2 | 2 | 2 | 2 | 2 |
|  | Sulfur | 2.5 | 2.5 | 2.5 | 2.5 | 2.5 | 2.5 | 2.5 | 2.5 | 2.5 | 2.5 |
|  | Vulcanization accelerator | 2 | 2 | 2 | 2 | 2 | 2 | 2 | 2 | 2 | 2 |
| Evaluation | Processability index | 103 | 100 | 101 | 99 | 98 | 100 | 115 | 113 | 105 | 110 |
|  | Rolling resistance index | 102 | 103 | 102 | 103 | 104 | 100 | 105 | 106 | 109 | 108 |
|  | Abrasion resistance index | 102 | 97 | 101 | 98 | 98 | 100 | 80 | 90 | 95 | 95 |

TABLE 4

|  |  | Comparative Example | Example | | | | | |
|---|---|---|---|---|---|---|---|---|
|  |  | 1 | 8 | 9 | 19 | 20 | 21 | 22 |
| Formulation (parts by mass) | Natural rubber | 50 | 50 | 50 | 50 | 50 | 50 | 50 |
|  | Polybutadiene rubber | 15 | 15 | 15 |  |  |  |  |
|  | Copolymer (3) | 35 | 35 | 35 | 35 | 35 | 35 | 35 |
|  | Copolymer (10) |  |  |  | 15 |  | 15 |  |
|  | Copolymer (11) |  |  |  |  | 15 |  | 15 |
|  | Carbon black | 35 | 35 | 35 | 35 | 35 | 35 | 35 |
|  | Silica (1) | 35 | 35 | 35 | 35 | 35 | 35 | 35 |
|  | Silica (2) |  |  |  |  |  |  |  |
|  | Silane coupling agent (1) | 2.8 |  |  |  | 2.8 | 2.8 |  |
|  | Silane coupling agent (2) |  | 2.8 |  | 2.8 |  |  |  |
|  | Silane coupling agent (3) |  |  | 2.8 |  |  | 2.8 | 2.8 |
|  | Process oil | 10 | 10 | 10 | 10 | 10 | 10 | 10 |
|  | Liquid resin |  |  |  |  |  |  |  |
|  | Wax | 2 | 2 | 2 | 2 | 2 | 2 | 2 |
|  | Antioxidant | 2 | 2 | 2 | 2 | 2 | 2 | 2 |
|  | Stearic acid | 2 | 2 | 2 | 2 | 2 | 2 | 2 |
|  | Zinc oxide | 2 | 2 | 2 | 2 | 2 | 2 | 2 |
|  | Sulfur | 2.5 | 2.5 | 2.5 | 2.5 | 2.5 | 2.5 | 2.5 |
|  | Vulcanization accelerator | 2 | 2 | 2 | 2 | 2 | 2 | 2 |
| Evaluation | Processability index | 103 | 113 | 105 | 106 | 108 | 104 | 106 |
|  | Rolling resistance index | 102 | 106 | 109 | 116 | 118 | 117 | 119 |
|  | Abrasion resistance index | 102 | 90 | 95 | 102 | 102 | 102 | 103 |

TABLE 5

|  |  | Example | | | Example | | | | | |
|---|---|---|---|---|---|---|---|---|---|---|
|  |  | 10 | 11 | 12 | 23 | 24 | 25 | 26 | 27 | 28 |
| Formulation (parts by mass) | Natural rubber | 50 | 50 | 50 | 50 | 50 | 50 | 50 | 50 | 50 |
|  | Polybutadiene rubber | 15 | 15 | 15 | 15 | 15 | 15 | 15 | 15 | 15 |
|  | Copolymer (14) | 35 |  |  |  |  |  |  |  |  |
|  | Copolymer (17) |  | 35 |  |  |  |  |  |  |  |
|  | Copolymer (20) |  |  | 35 |  |  |  |  |  |  |
|  | Copolymer (12) |  |  |  | 35 |  |  |  |  |  |
|  | Copolymer (13) |  |  |  |  | 35 |  |  |  |  |
|  | Copolymer (15) |  |  |  |  |  | 35 |  |  |  |
|  | Copolymer (16) |  |  |  |  |  |  | 35 |  |  |
|  | Copolymer (18) |  |  |  |  |  |  |  | 35 |  |
|  | Copolymer (19) |  |  |  |  |  |  |  |  | 35 |
|  | Carbon black | 35 | 35 | 35 | 35 | 35 | 35 | 35 | 35 | 35 |
|  | Silica (1) | 35 | 35 | 35 | 35 | 35 | 35 | 35 | 35 | 35 |
|  | Silane coupling agent (1) | 2.8 | 2.8 | 2.8 | 2.8 | 2.8 | 2.8 | 2.8 | 2.8 | 2.8 |
|  | Silane coupling agent (2) |  |  |  |  |  |  |  |  |  |
|  | Silane coupling agent (3) |  |  |  |  |  |  |  |  |  |
|  | Process oil | 10 | 10 | 10 | 10 | 10 | 10 | 10 | 10 | 10 |
|  | Liquid resin |  |  |  |  |  |  |  |  |  |

TABLE 5-continued

|  |  | Example | | | Example | | | | | |
| --- | --- | --- | --- | --- | --- | --- | --- | --- | --- | --- |
|  |  | 10 | 11 | 12 | 23 | 24 | 25 | 26 | 27 | 28 |
|  | Wax | 2 | 2 | 2 | 2 | 2 | 2 | 2 | 2 | 2 |
|  | Antioxidant | 2 | 2 | 2 | 2 | 2 | 2 | 2 | 2 | 2 |
|  | Stearic acid | 2 | 2 | 2 | 2 | 2 | 2 | 2 | 2 | 2 |
|  | Zinc oxide | 2 | 2 | 2 | 2 | 2 | 2 | 2 | 2 | 2 |
|  | Sulfur | 2.5 | 2.5 | 2.5 | 2.5 | 2.5 | 2.5 | 2.5 | 2.5 | 2.5 |
|  | Vulcanization accelerator | 2 | 2 | 2 | 2 | 2 | 2 | 2 | 2 | 2 |
| Evaluation | Processability index | 104 | 98 | 97 | 104 | 110 | 107 | 108 | 106 | 109 |
|  | Rolling resistance index | 105 | 107 | 106 | 112 | 111 | 106 | 106 | 104 | 105 |
|  | Abrasion resistance index | 99 | 99 | 100 | 106 | 105 | 104 | 105 | 104 | 104 |

TABLE 6

|  |  | Example | | | | | | | | | | | |
| --- | --- | --- | --- | --- | --- | --- | --- | --- | --- | --- | --- | --- | --- |
|  |  | 29 | 30 | 31 | 32 | 33 | 34 | 35 | 36 | 37 | 38 | 39 | 40 |
| Formulation (parts by mass) | Natural rubber | 50 | 50 | 50 | 50 | 50 | 50 | 50 | 50 | 50 | 50 | 50 | 50 |
|  | Polybutadiene rubber | 15 | 15 | 15 | 15 | 15 | 15 | 15 | 15 | 15 | 15 | 15 | 15 |
|  | Copolymer (14) |  |  |  |  |  |  |  |  |  |  |  |  |
|  | Copolymer (17) |  |  |  |  |  |  |  |  |  |  |  |  |
|  | Copolymer (20) |  |  |  |  |  |  |  |  |  |  |  |  |
|  | Copolymer (12) | 35 |  |  |  |  |  | 35 |  |  |  |  |  |
|  | Copolymer (13) |  | 35 |  |  |  |  |  | 35 |  |  |  |  |
|  | Copolymer (15) |  |  | 35 |  |  |  |  |  | 35 |  |  |  |
|  | Copolymer (16) |  |  |  | 35 |  |  |  |  |  | 35 |  |  |
|  | Copolymer (18) |  |  |  |  | 35 |  |  |  |  |  | 35 |  |
|  | Copolymer (19) |  |  |  |  |  | 35 |  |  |  |  |  | 35 |
|  | Carbon black | 35 | 35 | 35 | 35 | 35 | 35 | 35 | 35 | 35 | 35 | 35 | 35 |
|  | Silica (1) | 35 | 35 | 35 | 35 | 35 | 35 | 35 | 35 | 35 | 35 | 35 | 35 |
|  | Silane coupling agent (1) |  |  |  |  |  |  |  |  |  |  |  |  |
|  | Silane coupling agent (2) | 2.8 | 2.8 | 2.8 | 2.8 | 2.8 | 2.8 |  |  |  |  |  |  |
|  | Silane coupling agent (3) |  |  |  |  |  |  | 2.8 | 2.8 | 2.8 | 2.8 | 2.8 | 2.8 |
|  | Process oil | 10 | 10 | 10 | 10 | 10 | 10 | 10 | 10 | 10 | 10 | 10 | 10 |
|  | Liquid resin |  |  |  |  |  |  |  |  |  |  |  |  |
|  | Wax | 2 | 2 | 2 | 2 | 2 | 2 | 2 | 2 | 2 | 2 | 2 | 2 |
|  | Antioxidant | 2 | 2 | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 | 2 | 2 |
|  | Zinc oxide | 2 | 2 | 2 | 2 | 2 | 2 | 2 | 2 | 2 | 2 | 2 | 2 |
|  | Sulfur | 2.5 | 2.5 | 2.5 | 2.5 | 2.5 | 2.5 | 2.5 | 2.5 | 2.5 | 2.5 | 2.5 | 2.5 |
|  | Vulcanization accelerator | 2 | 2 | 2 | 2 | 2 | 2 | 2 | 2 | 2 | 2 | 2 | 2 |
| Evaluation | Processability index | 103 | 109 | 106 | 107 | 105 | 108 | 100 | 104 | 101 | 102 | 100 | 103 |
|  | Rolling resistance index | 118 | 117 | 112 | 112 | 110 | 111 | 122 | 121 | 116 | 116 | 114 | 115 |
|  | Abrasion resistance index | 111 | 110 | 109 | 110 | 109 | 109 | 113 | 112 | 111 | 112 | 111 | 111 |

TABLE 7

|  |  | Example | | | | | |
| --- | --- | --- | --- | --- | --- | --- | --- |
|  |  | 41 | 42 | 43 | 44 | 45 | 46 |
| Formulation (parts by mass) | Natural rubber | 50 | 50 | 50 | 50 | 50 | 50 |
|  | Polybutadiene rubber | 15 | 15 | 15 | 15 | 35 | 15 |
|  | Copolymer (3) |  |  |  |  |  |  |
|  | Copolymer (6) |  |  |  |  |  |  |
|  | Copolymer (2) |  |  |  |  |  |  |
|  | Copolymer (9) |  |  |  |  |  |  |
|  | Copolymer (5) |  |  |  |  |  |  |
|  | Copolymer (1) | 35 |  |  |  | 15 | 35 |
|  | Copolymer (4) |  | 35 |  |  |  |  |
|  | Copolymer (7) |  |  | 35 |  |  |  |
|  | Copolymer (8) |  |  |  | 35 |  |  |
|  | Carbon black | 35 | 35 | 35 | 35 | 35 | 35 |
|  | Silica (1) | 25 | 25 | 25 | 25 | 25 | 25 |
|  | Silica (2) | 10 | 10 | 10 | 10 | 10 | 10 |
|  | Silane coupling agent (1) | 2.8 | 2.8 | 2.8 | 2.8 | 2.8 | 2.8 |
|  | Process oil | 10 | 10 | 10 | 10 | 10 | 5 |
|  | Liquid resin |  |  |  |  |  | 5 |
|  | Wax | 2 | 2 | 2 | 2 | 2 | 2 |
|  | Antioxidant | 2 | 2 | 2 | 2 | 2 | 2 |
|  | Stearic acid | 2 | 2 | 2 | 2 | 2 | 2 |
|  | Zinc oxide | 2 | 2 | 2 | 2 | 2 | 2 |
|  | Sulfur | 2.5 | 2.5 | 2.5 | 2.5 | 2.5 | 2.5 |
|  | Vulcanization accelerator | 2 | 2 | 2 | 2 | 2 | 2 |
| Evaluation | Processability index | 110 | 113 | 113 | 112 | 118 | 116 |
|  | Rolling resistance index | 118 | 112 | 112 | 111 | 113 | 119 |
|  | Abrasion resistance index | 103 | 102 | 105 | 105 | 100 | 102 |

TABLE 8

| | | Comparative Example | | | | | | | | |
|---|---|---|---|---|---|---|---|---|---|---|
| | | 1 | 2 | 3 | 4 | 5 | 6 | 7 | 13 | 14 |
| Formulation (parts by mass) | Natural rubber | 50 | 50 | 50 | 50 | 50 | 50 | 50 | 50 | 50 |
| | Polybutadiene rubber | 15 | 15 | 15 | 15 | 15 | 50 | 50 | 15 | |
| | Copolymer (3) | 35 | | | | | | | 35 | |
| | Copolymer (6) | | 35 | | | | | | | |
| | Copolymer (2) | | | 35 | | | | | | |
| | Copolymer (9) | | | | 35 | | | | | |
| | Copolymer (5) | | | | | 35 | | | | |
| | Copolymer (1) | | | | | | | | | 50 |
| | Copolymer (4) | | | | | | | | | |
| | Copolymer (7) | | | | | | | | | |
| | Copolymer (8) | | | | | | | | | |
| | Carbon black | 35 | 35 | 35 | 35 | 35 | 70 | 35 | 35 | 35 |
| | Silica (1) | 35 | 35 | 35 | 35 | 35 | | 35 | 25 | 25 |
| | Silica (2) | | | | | | | | 10 | 10 |
| | Silane coupling agent (1) | 2.8 | 2.8 | 2.8 | 2.8 | 2.8 | | 2.8 | 2.8 | 2.8 |
| | Process oil | 10 | 10 | 10 | 10 | 10 | 10 | 10 | 10 | 10 |
| | Liquid resin | | | | | | | | | |
| | Wax | 2 | 2 | 2 | 2 | 2 | 2 | 2 | 2 | 2 |
| | Antioxidant | 2 | 2 | 2 | 2 | 2 | 2 | 2 | 2 | 2 |
| | Stearic acid | 2 | 2 | 2 | 2 | 2 | 2 | 2 | 2 | 2 |
| | Zinc oxide | 2 | 2 | 2 | 2 | 2 | 2 | 2 | 2 | 2 |
| | Sulfur | 2.5 | 2.5 | 2.5 | 2.5 | 2.5 | 2.5 | 2.5 | 2.5 | 2.5 |
| | Vulcanization accelerator | 2 | 2 | 2 | 2 | 2 | 2 | 2 | 2 | 2 |
| Evaluation | Processability index | 103 | 100 | 101 | 99 | 98 | 100 | 115 | 101 | 103 |
| | Rolling resistance index | 102 | 103 | 102 | 103 | 104 | 100 | 105 | 102 | 104 |
| | Abrasion resistance index | 102 | 97 | 101 | 98 | 98 | 100 | 80 | 105 | 97 |

TABLE 9

| | | Comparative Example | Example | | |
|---|---|---|---|---|---|
| | | 1 | 13 | 47 | 48 |
| Formulation (parts by mass) | Natural rubber | 50 | 50 | 50 | 50 |
| | Polybutadiene rubber | 15 | 15 | | |
| | Copolymer (3) | 35 | 35 | 35 | 35 |
| | Copolymer (10) | | | 15 | |
| | Copolymer (11) | | | | 15 |
| | Carbon black | 35 | 35 | 35 | 35 |
| | Silica (1) | 35 | 25 | 25 | 25 |
| | Silica (2) | | 10 | 10 | 10 |
| | Silane coupling agent (1) | 2.8 | 2.8 | 2.8 | 2.8 |
| | Process oil | 10 | 10 | 10 | 10 |
| | Liquid resin | | | | |
| | Wax | 2 | 2 | 2 | 2 |
| | Antioxidant | 2 | 2 | 2 | 2 |
| | Stearic acid | 2 | 2 | 2 | 2 |
| | Zinc oxide | 2 | 2 | 2 | 2 |
| | Sulfur | 2.5 | 2.5 | 2.5 | 2.5 |
| | Vulcanization accelerator | 2 | 2 | 2 | 2 |
| Evaluation | Processability index | 103 | 101 | 105 | 107 |
| | Rolling resistance index | 102 | 102 | 118 | 120 |
| | Abrasion resistance index | 102 | 105 | 102 | 102 |

TABLE 10

| | | Example | | | | | |
|---|---|---|---|---|---|---|---|
| | | 49 | 50 | 51 | 52 | 53 | 54 |
| Formulation (parts by mass) | Natural rubber | 50 | 50 | 50 | 50 | 50 | 50 |
| | Polybutadiene rubber | 15 | 15 | 15 | 15 | 15 | 15 |
| | Copolymer (14) | | | | | | |
| | Copolymer (17) | | | | | | |
| | Copolymer (20) | | | | | | |
| | Copolymer (12) | 35 | | | | | |
| | Copolymer (13) | | 35 | | | | |
| | Copolymer (15) | | | 35 | | | |
| | Copolymer (16) | | | | 35 | | |
| | Copolymer (18) | | | | | 35 | |
| | Copolymer (19) | | | | | | 35 |
| | Carbon black | 35 | 35 | 35 | 35 | 35 | 35 |
| | Silica (1) | 25 | 25 | 25 | 25 | 25 | 25 |
| | Silica (2) | 10 | 10 | 10 | 10 | 10 | 10 |
| | Silane coupling agent (1) | 2.8 | 2.8 | 2.8 | 2.8 | 2.8 | 2.8 |
| | Process oil | 10 | 10 | 10 | 10 | 10 | 10 |
| | Wax | 2 | 2 | 2 | 2 | 2 | 2 |
| | Antioxidant | 2 | 2 | 2 | 2 | 2 | 2 |
| | Stearic acid | 2 | 2 | 2 | 2 | 2 | 2 |
| | Zinc oxide | 2 | 2 | 2 | 2 | 2 | 2 |
| | Sulfur | 2.5 | 2.5 | 2.5 | 2.5 | 2.5 | 2.5 |
| | Vulcanization accelerator | 2 | 2 | 2 | 2 | 2 | 2 |
| Evaluation | Processability index | 102 | 108 | 105 | 106 | 104 | 107 |
| | Rolling resistance index | 112 | 111 | 106 | 106 | 104 | 105 |
| | Abrasion resistance index | 109 | 108 | 107 | 108 | 107 | 107 |

TABLE 11

| | | Example | | | | |
|---|---|---|---|---|---|---|
| | | 55 | 56 | 57 | 58 | 59 |
| Formulation (parts by mass) | Natural rubber | 50 | 50 | 50 | 50 | 50 |
| | Polybutadiene rubber | 15 | 15 | 15 | 15 | 35 |
| | Copolymer (3) | | | | | |
| | Copolymer (6) | | | | | |

TABLE 11-continued

|  |  | Example | | | | |
|---|---|---|---|---|---|---|
|  |  | 55 | 56 | 57 | 58 | 59 |
|  | Copolymer (2) | | | | | |
|  | Copolymer (9) | | | | | |
|  | Copolymer (5) | | | | | |
|  | Copolymer (1) | 35 | | | | 15 |
|  | Copolymer (4) | | 35 | | | |
|  | Copolymer (7) | | | 35 | | |
|  | Copolymer (8) | | | | 35 | |
|  | Carbon black | 35 | 35 | 35 | 35 | 35 |
|  | Silica (1) | 35 | 35 | 35 | 35 | 35 |
|  | Silane coupling agent (1) | 2.8 | 2.8 | 2.8 | 2.8 | 2.8 |
|  | Process oil | 5 | 5 | 5 | 5 | 5 |
|  | Liquid resin | 5 | 5 | 5 | 5 | 5 |
|  | Wax | 2 | 2 | 2 | 2 | 2 |
|  | Antioxidant | 2 | 2 | 2 | 2 | 2 |
|  | Stearic acid | 2 | 2 | 2 | 2 | 2 |
|  | Zinc oxide | 2 | 2 | 2 | 2 | 2 |
|  | Sulfur | 2.5 | 2.5 | 2.5 | 2.5 | 2.5 |
|  | Vulcanization accelerator | 2 | 2 | 2 | 2 | 2 |
| Evaluation | Processability index | 110 | 112 | 113 | 111 | 117 |
|  | Rolling resistance index | 115 | 110 | 110 | 109 | 111 |
|  | Abrasion resistance index | 106 | 105 | 108 | 109 | 102 |

TABLE 12

|  |  | Comparative Example | | | | | | | | |
|---|---|---|---|---|---|---|---|---|---|---|
|  |  | 1 | 2 | 3 | 4 | 5 | 6 | 7 | 15 | 16 |
| Formulation (parts by mass) | Natural rubber | 50 | 50 | 50 | 50 | 50 | 50 | 50 | 50 | 50 |
|  | Polybutadiene rubber | 15 | 15 | 15 | 15 | 15 | 50 | 50 | 15 | |
|  | Copolymer (3) | 35 | | | | | | | 35 | |
|  | Copolymer (6) | | 35 | | | | | | | |
|  | Copolymer (2) | | | 35 | | | | | | |
|  | Copolymer (9) | | | | 35 | | | | | |
|  | Copolymer (5) | | | | | 35 | | | | |
|  | Copolymer (1) | | | | | | | | | 50 |
|  | Copolymer (4) | | | | | | | | | |
|  | Copolymer (7) | | | | | | | | | |
|  | Copolymer (8) | | | | | | | | | |
|  | Carbon black | 35 | 35 | 35 | 35 | 35 | 70 | 35 | 35 | 35 |
|  | Silica (1) | 35 | 35 | 35 | 35 | 35 | | 35 | 35 | 35 |
|  | Silane coupling agent (1) | 2.8 | 2.8 | 2.8 | 2.8 | 2.8 | | 2.8 | 2.8 | 2.8 |
|  | Process oil | 10 | 10 | 10 | 10 | 10 | 10 | 10 | 5 | 5 |
|  | Liquid resin | | | | | | | | 5 | 5 |
|  | Wax | 2 | 2 | 2 | 2 | 2 | 2 | 2 | 2 | 2 |
|  | Antioxidant | 2 | 2 | 2 | 2 | 2 | 2 | 2 | 2 | 2 |
|  | Stearic acid | 2 | 2 | 2 | 2 | 2 | 2 | 2 | 2 | 2 |
|  | Zinc oxide | 2 | 2 | 2 | 2 | 2 | 2 | 2 | 2 | 2 |
|  | Sulfur | 2.5 | 2.5 | 2.5 | 2.5 | 2.5 | 2.5 | 2.5 | 2.5 | 2.5 |
|  | Vulcanization accelerator | 2 | 2 | 2 | 2 | 2 | 2 | 2 | 2 | 2 |
| Evaluation | Processability index | 103 | 100 | 101 | 99 | 98 | 100 | 115 | 104 | 111 |
|  | Rolling resistance index | 102 | 103 | 102 | 103 | 104 | 100 | 105 | 103 | 108 |
|  | Abrasion resistance index | 102 | 97 | 101 | 98 | 98 | 100 | 80 | 101 | 96 |

TABLE 13

|  |  | Comparative Example | Example | | |
|---|---|---|---|---|---|
|  |  | 1 | 15 | 60 | 61 |
| Formulation (parts by mass) | Natural rubber | 50 | 50 | 50 | 50 |
|  | Polybutadiene rubber | 15 | 15 | | |
|  | Copolymer (3) | 35 | 35 | 35 | 35 |
|  | Copolymer (10) | | | 15 | |
|  | Copolymer (11) | | | | 15 |
|  | Carbon black | 35 | 35 | 35 | 35 |
|  | Silica (1) | 35 | 35 | 35 | 35 |
|  | Silane coupling agent (1) | 2.8 | 2.8 | 2.8 | 2.8 |
|  | Process oil | 10 | 5 | 5 | 5 |
|  | Liquid resin | | 5 | 5 | 5 |
|  | Wax | 2 | 2 | 2 | 2 |
|  | Antioxidant | 2 | 2 | 2 | 2 |
|  | Stearic acid | 2 | 2 | 2 | 2 |
|  | Zinc oxide | 2 | 2 | 2 | 2 |
|  | Sulfur | 2.5 | 2.5 | 2.5 | 2.5 |
|  | Vulcanization accelerator | 2 | 2 | 2 | 2 |
| Evaluation | Processability index | 103 | 104 | 120 | 122 |
|  | Rolling resistance index | 102 | 103 | 105 | 107 |
|  | Abrasion resistance index | 102 | 101 | 102 | 102 |

TABLE 14

|  |  | Example | | | | | |
|---|---|---|---|---|---|---|---|
|  |  | 62 | 63 | 64 | 65 | 66 | 67 |
| Formulation (parts by mass) | Natural rubber | 50 | 50 | 50 | 50 | 50 | 50 |
|  | Polybutadiene rubber | 15 | 15 | 15 | 15 | 15 | 15 |
|  | Copolymer (14) | | | | | | |
|  | Copolymer (17) | | | | | | |
|  | Copolymer (20) | | | | | | |

TABLE 14-continued

|  |  | Example | | | | | |
|---|---|---|---|---|---|---|---|
|  |  | 62 | 63 | 64 | 65 | 66 | 67 |
|  | Copolymer (12) | 35 |  |  |  |  |  |
|  | Copolymer (13) |  | 35 |  |  |  |  |
|  | Copolymer (15) |  |  | 35 |  |  |  |
|  | Copolymer (16) |  |  |  | 35 |  |  |
|  | Copolymer (18) |  |  |  |  | 35 |  |
|  | Copolymer (19) |  |  |  |  |  | 35 |
|  | Carbon black | 35 | 35 | 35 | 35 | 35 | 35 |
|  | Silica (1) | 35 | 35 | 35 | 35 | 35 | 35 |
|  | Silane coupling agent (1) | 2.8 | 2.8 | 2.8 | 2.8 | 2.8 | 2.8 |
|  | Process oil | 5 | 5 | 5 | 5 | 5 | 5 |
|  | Liquid resin | 5 | 5 | 5 | 5 | 5 | 5 |
|  | Wax | 2 | 2 | 2 | 2 | 2 | 2 |
|  | Antioxidant | 2 | 2 | 2 | 2 | 2 | 2 |
|  | Stearic acid | 2 | 2 | 2 | 2 | 2 | 2 |
|  | Zinc oxide | 2 | 2 | 2 | 2 | 2 | 2 |
|  | Sulfur | 2.5 | 2.5 | 2.5 | 2.5 | 2.5 | 2.5 |
|  | Vulcanization accelerator | 2 | 2 | 2 | 2 | 2 | 2 |
| Evaluation | Processability index | 105 | 111 | 108 | 109 | 107 | 110 |
|  | Rolling resistance index | 113 | 112 | 107 | 107 | 105 | 106 |
|  | Abrasion resistance index | 105 | 104 | 103 | 104 | 103 | 103 |

As shown in Tables 2 to 14, since each of the rubber compositions of the examples contains a specific amount of a conjugated diene copolymer having a specific amine structure at an initiation terminal, a structural unit derived from a silicon-containing compound at a main chain, and a structural unit derived from a compound containing a nitrogen atom and/or a silicon atom at a termination terminal, a specific amount of silica, and a specific amount of a silane coupling agent, these rubber compositions exhibited a balanced improvement in fuel economy, abrasion resistance, and processability as compared to the rubber compositions of the comparative examples.

The rubber compositions of Examples 6 to 67, each containing the conjugated diene polymer together with at least one of a mercapto group-containing silane coupling agent, a combination of two kinds of silica having specific nitrogen adsorption specific surface areas, and a liquid resin having a specific softening point, exhibited greatly improved properties.

The invention claimed is:

1. A rubber composition, comprising:
a conjugated diene polymer;
a polyisoprene-based rubber;
silica; and
a silane coupling agent,
wherein the conjugated diene polymer being obtained by polymerizing a monomer component including a conjugated diene compound and a silicon-containing vinyl compound in the presence of a polymerization initiator represented by the following formula (I):

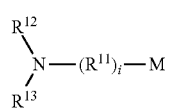 (I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and
then reacting a compound containing at least one of a nitrogen atom and a silicon atom with an active terminal of the copolymer,
wherein the rubber composition comprises
the conjugated diene polymer in an amount of 15 to 45% by mass, and the polyisoprene-based rubber in an amount of 35 to 70% by mass, based on 100% by mass of a rubber component of the rubber composition,
the silica in an amount of 5 to 100 parts by mass for each 100 parts by mass of the rubber component, and
the silane coupling agent in an amount of 2 to 12 parts by mass for each 100 parts by mass of the silica.

2. The rubber composition according to claim 1,
wherein $R^{11}$ in the formula (I) is a group represented by the following formula (Ia):

 (Ia)

wherein $R^{14}$ represents a hydrocarbylene group comprising at least one of a structural unit derived from a conjugated diene compound and a structural unit derived from an aromatic vinyl compound; and n represents an integer of 1 to 10.

3. The rubber composition according to claim 2,
wherein $R^{14}$ in the formula (Ia) is a hydrocarbylene group comprising from one to ten isoprene-derived structural unit(s).

4. The rubber composition according to claim 1,
wherein the silicon-containing vinyl compound is a compound represented by the following formula (II):

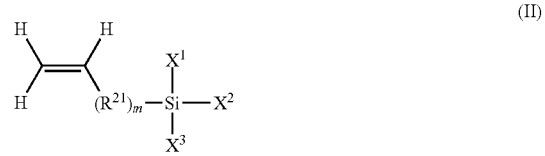 (II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

5. The rubber composition according to claim 1,
wherein the conjugated diene polymer contains a structural unit derived from an aromatic vinyl compound.

6. The rubber composition according to claim 1,
wherein the silica includes silica (1) having a nitrogen adsorption specific surface area of at least 40 m²/g but less than 120 m²/g, and silica (2) having a nitrogen adsorption specific surface area of not less than 120 m²/g.

7. The rubber composition according to claim 1, comprising
a liquid resin having a softening point of −20 to 20° C. in an amount of 1 to 10 parts by mass for each 100 parts by mass of the rubber component.

8. The rubber composition according to claim 1,
wherein the silica includes silica (1) having a nitrogen adsorption specific surface area of at least 40 m²/g but less than 120 m²/g, and silica (2) having a nitrogen adsorption specific surface area of not less than 120 m²/g, and the rubber composition comprises a liquid resin having a softening point of −20 to 20° C. in an amount of 1 to 10 parts by mass for each 100 parts by mass of the rubber component.

9. The rubber composition according to claim 1,
wherein the silane coupling agent is a compound containing a mercapto group.

10. The rubber composition according to claim 1,
wherein the silane coupling agent is a compound containing a mercapto group, and
the silica includes silica (1) having a nitrogen adsorption specific surface area of at least 40 m²/g but less than 120 m²/g, and silica (2) having a nitrogen adsorption specific surface area of not less than 120 m²/g.

11. The rubber composition according to claim 1,
wherein the silane coupling agent is a compound containing a mercapto group, and
the rubber composition comprises a liquid resin having a softening point of −20 to 20° C. in an amount of 1 to 10 parts by mass for each 100 parts by mass of the rubber component.

12. The rubber composition according to claim 1,
wherein the silane coupling agent is a compound containing a mercapto group, the silica includes silica (1) having a nitrogen adsorption specific surface area of at least 40 m²/g but less than 120 m²/g, and silica (2) having a nitrogen adsorption specific surface area of not less than 120 m²/g, and
the rubber composition comprises a liquid resin having a softening point of −20 to 20° C. in an amount of 1 to 11 parts by mass for each 100 parts by mass of the rubber component.

13. The rubber composition according to claim 1,
wherein the silane coupling agent is at least one of a compound represented by the formula (1) below, and a compound containing a linking unit A represented by the formula (2) below and a linking unit B represented by the formula (3) below,

wherein $R^{101}$ to $R^{103}$ each represent a branched or unbranched $C_{1-12}$ alkyl group, a branched or unbranched $C_{1-12}$ alkoxy group, or a group represented by —O—$(R^{111}$—O$)_z$—$R^{112}$ where $z$ $R^{111}$s each represent a branched or unbranched $C_{1-30}$ divalent hydrocarbon group, and $z$ $R^{111}$s may be the same as or different from one another; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and $z$ represents an integer of 1 to 30, and $R^{101}$ to $R^{103}$ may be the same as or different from one another; and $R^{104}$ represents a branched or unbranched $C_{1-6}$ alkylene group;

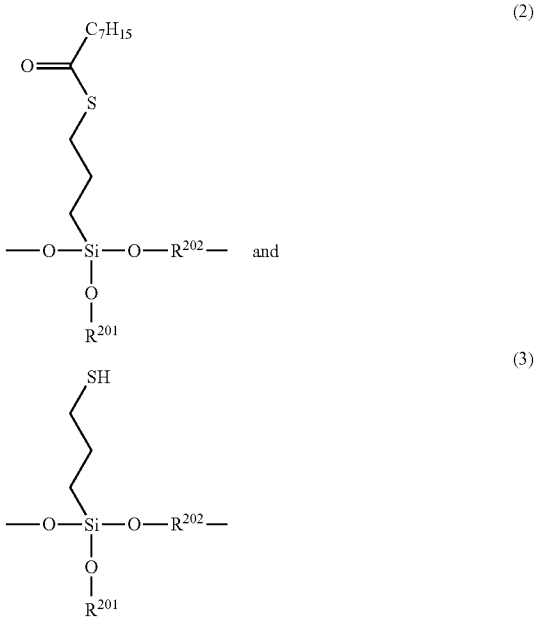

wherein $R^{201}$ represents a hydrogen atom, a halogen atom, a branched or unbranched $C_{1-30}$ alkyl group, a branched or unbranched $C_{2-30}$ alkenyl group, a branched or unbranched $C_{2-30}$ alkynyl group, or the alkyl group in which a terminal hydrogen atom is replaced with a hydroxy group or a carboxyl group; $R^{202}$ represents a branched or unbranched $C_{1-30}$ alkylene group, a branched or unbranched $C_{2-30}$ alkenylene group, or a branched or unbranched $C_{2-30}$ alkynylene group; and $R^{201}$ and $R^{202}$ may be joined together to form a cyclic structure.

14. The rubber composition according to claim 1,
wherein the silica includes silica (1) having a nitrogen adsorption specific surface area of at least 40 m²/g but less than 120 m²/g, and silica (2) having a nitrogen adsorption specific surface area of not less than 120 m²/g, and
the nitrogen adsorption specific surface areas and amounts of the silica (1) and the silica (2) satisfy the following inequalities:

(Nitrogen adsorption specific surface area of silica (2))/(Nitrogen adsorption specific surface area of silica (1))≥1.4, and (Amount of silica (1))×0.06≤(Amount of silica (2))≤ (Amount of silica (1))×15.

15. A pneumatic tire, formed from the rubber composition according to claim 1.

16. The rubber composition according to claim 2,
wherein the silicon-containing vinyl compound is a compound represented by the following formula (II):

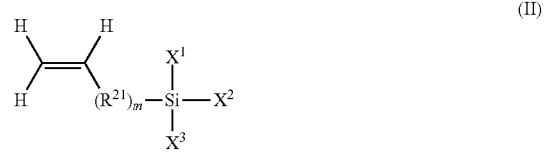

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

17. The rubber composition according to claim 3, wherein the silicon-containing vinyl compound is a compound represented by the following formula (II):

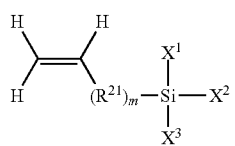

(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

18. The rubber composition according to claim 2, wherein the conjugated diene polymer contains a structural unit derived from an aromatic vinyl compound.

19. The rubber composition according to claim 3, wherein the conjugated diene polymer contains a structural unit derived from an aromatic vinyl compound.

20. The rubber composition according to claim 4, wherein the conjugated diene polymer contains a structural unit derived from an aromatic vinyl compound.

21. The rubber composition according to claim 1, wherein the compound containing at least one of a nitrogen atom and a silicon atom is at least one selected from the group consisting of a compound represented by the formula (III), a compound represented by the formula (IV), an alkoxysilyl group-containing compound containing a nitrogen atom and a carbonyl group, and an N,N-dialkyl-substituted carboxylic acid amide dialkyl acetyl compound,

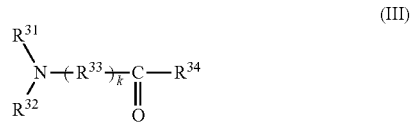

(III)

wherein $R^{31}$ represents an optionally substituted hydrocarbyl group, or is joined to $R^{32}$ to form a hydrocarbylene group optionally containing a nitrogen atom and/or an oxygen atom as a hetero atom, or is joined to $R^{34}$ to form a divalent group; $R^{32}$ represents an optionally substituted hydrocarbyl group, or is joined to $R^{31}$ to form a hydrocarbylene group optionally containing a nitrogen atom and/or an oxygen atom as a hetero atom; and $R^{34}$ represents an optionally substituted hydrocarbyl group or a hydrogen atom, or is joined to $R^{31}$ to form a divalent group; $R^{33}$ represents a divalent group; and k represents an integer of 0 or 1,

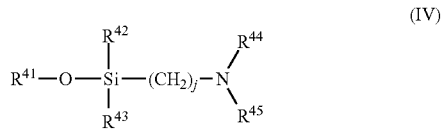

(IV)

wherein $R^{41}$ represents a hydrcarbyl group; $R^{42}$ and $R^{43}$ each represents a hydrocarbyl group or a hydrocarbyloxy group; $R^{44}$ represents an optionally substituted hydrocarbyl group or a trihydrocarbylsilyl group, or is joined to $R^{45}$ to form a hydrocarbylene group optionally containing at least one, as a hetero atom, selected from the group consisting of a silicon atom, a nitrogen atom and an oxygen atom; $R^{45}$ represents an optionally substituted hydrocarbyl group or a trihydrocarbylsilyl group, or is joined to $R^{44}$ to form a hydrocarbylene group optionally containing at least one, as a hetero atom, selected from the group consisting of a silicon atom, a nitrogen atom and an oxygen atom; and j represents an integer of 1 to 5.

* * * * *